United States Patent
Nicolaas Mul et al.

(10) Patent No.: US 12,500,617 B2
(45) Date of Patent: Dec. 16, 2025

(54) METHOD OF APPLYING AN ACTIVATION SCHEME TO A DIGITALLY CONTROLLED SEGMENTED RF POWER TRANSMITTER

(71) Applicant: TECHNISCHE UNIVERSITEIT DELFT, Delft (NL)

(72) Inventors: Dieuwert Peter Nicolaas Mul, Delft (NL); Robert Jan Bootsman, Delft (NL); Mohammad Reza Beikmirza, Delft (NL); Seyed Morteza Alavi, Delft (NL); Leonardus Cornelis Nicolaas de Vreede, Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 152 days.

(21) Appl. No.: 18/263,896

(22) PCT Filed: Feb. 4, 2022

(86) PCT No.: PCT/NL2022/050055
§ 371 (c)(1),
(2) Date: Aug. 2, 2023

(87) PCT Pub. No.: WO2022/169362
PCT Pub. Date: Aug. 11, 2022

(65) Prior Publication Data
US 2024/0146346 A1    May 2, 2024

(30) Foreign Application Priority Data
Feb. 5, 2021    (NL) .......................... 2027510

(51) Int. Cl.
*H04B 1/04*    (2006.01)
(52) U.S. Cl.
CPC .................. *H04B 1/0475* (2013.01)

(58) Field of Classification Search
CPC .......... H04B 1/0475; H04B 1/04; H04B 1/02; H03F 2200/451; H03F 3/24; H03M 1/66
See application file for complete search history.

(56) References Cited

U.S. PATENT DOCUMENTS 8,385,469 B2    2/2013    Wang
8,570,101 B2 *  10/2013   Apostolidou ......... H03F 1/0294
                                              330/10

(Continued)

FOREIGN PATENT DOCUMENTS

WO    2018/132006 A1    7/2018

OTHER PUBLICATIONS

Thyagarajan et al., "Efficient Switching Power Amplifiers Using the Distributed Switch Architecture", IEEE Transactions On Circuits and Systems I: Regular Papers, IEEE, US, vol. 60, No. 10, Oct. 1, 2013 (Oct. 1, 2013), pp. 2774-2787, XP011528045, ISSN: 1549-8328, DOI: 10.1109/TCSI.2013.2248811.

(Continued)

*Primary Examiner* — Jean B Corrielus
(74) *Attorney, Agent, or Firm* — Ipsilon USA - NLO

(57) ABSTRACT

A method of applying an activation scheme to a digitally controlled segmented RF power transmitter having a plurality of adjacent segments (3), each segment (3) having an associated activation area, the segments (3) being controlled by one or more code words (CWD) The method includes controlling segments (3) by activating a specific segment (3) using an activation scheme for activating specific ones of the segments (3) depending on the code word (CWD), the activation scheme starting from center ones of the plurality of segments (3) towards outer ones of the plurality of segments (3) for increasing code word (CWD) values. This method can be applied in any digitally controlled segmented RF power transmitter, be it in polar or Cartesian implemen- (Continued)

tations, and in single ended or push-pull output configurations.

19 Claims, 19 Drawing Sheets

(56) References Cited

U.S. PATENT DOCUMENTS

| | | | |
|---|---|---|---|
| 10,200,232 B1 | | 2/2019 | Wentzloff |
| 10,389,316 B1 | * | 8/2019 | Silva-Martinez .... H04B 1/0458 |
| 2011/0260797 A1 | * | 10/2011 | Lee .................... H03F 3/211 |
| | | | 330/124 R |
| 2013/0058435 A1 | | 3/2013 | Matsuura |
| 2014/0184328 A1 | * | 7/2014 | Binet .................. H03F 1/0277 |
| | | | 330/251 |

OTHER PUBLICATIONS

Morteza S. Alavi, Robert B. Staszewski, Leo C. N. de Vreede;, John R. Long, Orthogonal summing and power combining network in a 65-nm all-digital RF I/Q modulator, 2011 IEEE International Symposium on Radio-Frequency Integration Technology, year 2011.

W. Gaber, et al., "A CMOS IQ Direct digital RF modulator with embedded RF FIR-based quantization noise filter" ESSCIRC 2011, pp. 139-142.

Morteza S. Alavi, Akshay Visweswaran, Robert B. Staszewski, Leo C.N de Vreede, John R. Long, Atef Akhnoukh, A 2-GHz digital I/Q modulator in 65-nm CMOS, IEEE Asian Solid-State Circuits Conference 2011, 2011.

Morteza Alavi, Robert Bogdan Staszewski, L.C.N. de Vreede, Akshay Vissweswaran, and John Long, "All Digital RF I/Q Modulator," IEEE MTT, vol. 60 issue 11, pp. 3513-3526, 2012.

Chao Lu, et al. "A 24.7dBm All-Digital RF Transmitter for Multimode Broadband Application in 40nm CMOS", in Proc. of IEEE ISCCC , pp. 332-333, Feb. 2013.

Morteza S. Alavi;George Voicu; Robert B. Staszewski;Leo C. N. de Vreede;John R. Long, A 2×13-bit all-digital I/Q RR-DAC in 65-nm CMOS, 2013 IEEE Radio Frequency Integrated Circuits Symposium (RFIC), 2013.

M.S. Alavi, R.G. Staszewski, L.C.N. de Vreede, J. R. Long, A Wideband 2× 13-bit All-Digital I/Q RF-DAC, IEEE Transactions on Microwave Theory and Techniques, vol. 62 , Issue: 4 , Part: 1, 2014 , pp. 732-752.

Z. Deng et al., "A dual-band digital-WiFi 802.11a/b/g/n transmitter SoC with digital I/Q combining and diamond profile mapping for compact die area and improved efficiency in 40nm CMOS," in IEEE ISSCC Dig. Tech. Papers, Feb. 2016, pp. 172-173.

H. Jin et al., "Efficient digital quadrature transmitter based on IQ cell sharing," in IEEE ISSCC Dig. Tech. Papers, Feb. 2015, pp. 168-169.

W. Gaber, et al., "A 21-dBm I/Q Digital Transmitter Using Stacked Output Stage in 28-nm Bulk CMOS Technology,", TMTT 2017, pp. 4744-4757.

Yiyu Shen, Rob Bootsman, Morteza S. Alavi, Leonardus de Vreede, A 0.5-3 GHz I/Q Interleaved Direct-Digital RF Modulator with up to 320 MHz Modulation Bandwidth in 40 nm CMOS, 2020 IEEE Custom Integrated Circuits Conference (CICC), Mar. 22-25, 2020.

Yiyu Shen, Rob Bootsman, Morteza S. Alavi, Leo C.N. De Vreede, A 1-3 Ghz I/Q Interleaved Direct-Digital RF Modulator As A Driver for A Common-Gate PA in 40 nm CMOS, RFIC 2020-2020 IEEE Radio Frequency Integrated Circuits Symposium.

L. Xiong, et al., "A Broadband Switched-Transformer Digital Power Amplifier for Deep Back-Off Efficiency Enhancement," ISSCC, pp. 76-77, 2019.

R.J. Bootsman, D.P.N. Mul, Y. Shen, R.M. Heeres, F. van Rijs, M.S. Alavi, L.C.N. de Vreede, "An 18.5 W Fully-Digital Transmitter with 60.4 % Peak System Efficiency," accepted for publication at the IMS 2020 conference, Jun. 2020.

* cited by examiner

Fig. 8 --PRIOR ART--
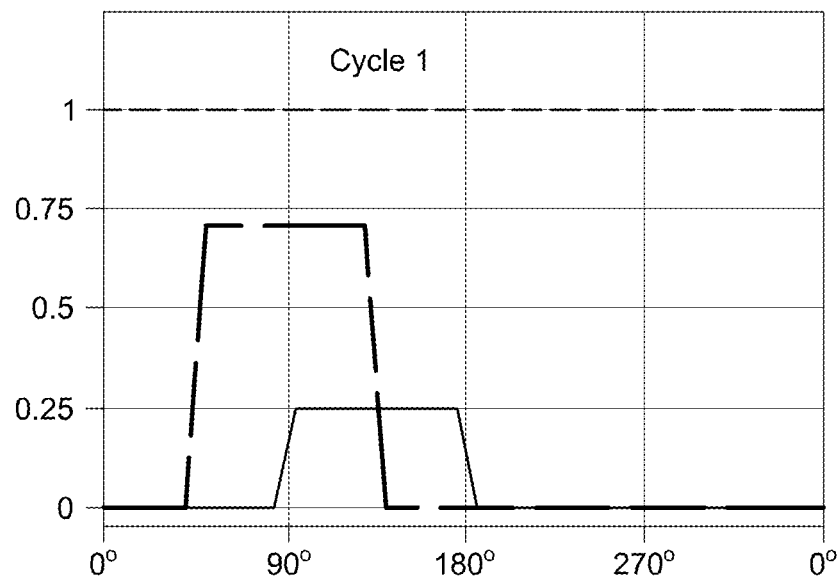
Fig. 9
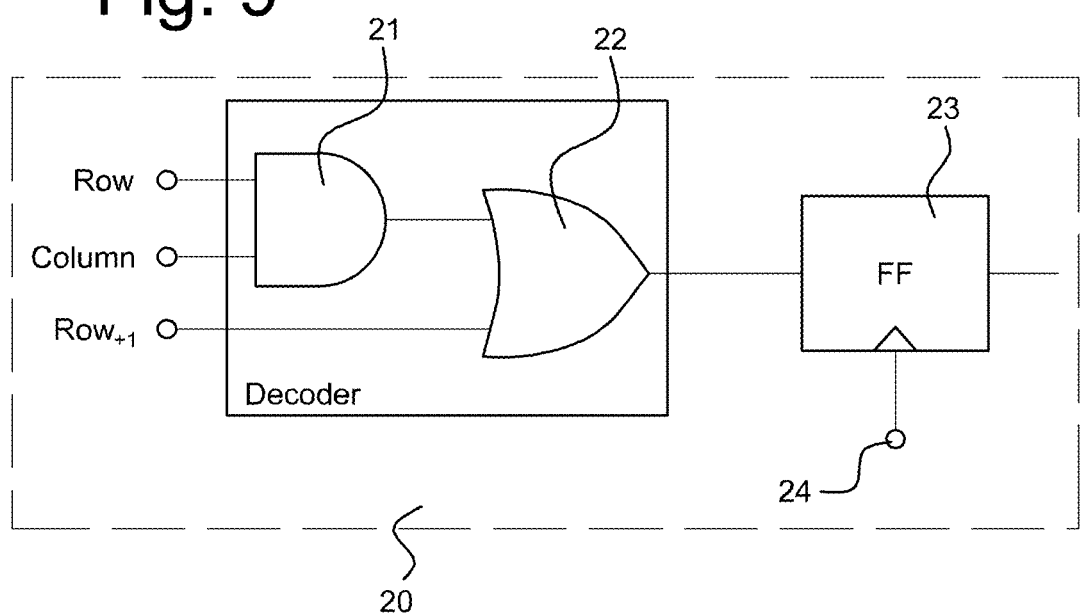

METHOD OF APPLYING AN ACTIVATION SCHEME TO A DIGITALLY CONTROLLED SEGMENTED RF POWER TRANSMITTER

FIELD OF THE INVENTION

The present invention relates to the optimum activation of the unit cells in an digital transmitter (DTX) switch bank or segmented output stage, or more specifically to a method of applying an activation scheme to a digitally controlled segmented RF power transmitter having a plurality of adjacent segments, each segment having an associated activation area, the segments being controlled by a code word CWD.

BACKGROUND ART

Transmitters for wired and wireless systems are traditionally analogue in nature for their RF frontend 105, as shown in the generic block diagram of FIG. 1. Such transmitters comprise a digital input processing part 101 to convert the digital baseband information, which is typically represented by a stream of in-phase ($I_{BB}$) and quadrature ($Q_{BB}$) digital code words output from an I/Q baseband processing unit 102, directly to the analogue domain by using base-band digital-to-analogue converters DACs 103, controlled by clock 104. The transmitter further comprises an RF front-end 105, that processes the analog signals output by the DACs 103 using low-pass filters 108 to remove the sampling replicas. Next quadrature frequency up-conversion takes place, using an analogue quadrature mixer configuration, providing the amplitude and phase modulated RF signal ($RF_{mod}$). The analogue quadrature mixer configuration comprises a local oscillator 107, phase shifter 106, multipliers 109 and adder 110. This signal is amplified by a chain of amplifying stages (driver 111) and a power amplifier 112, to bring the RF out signal 7 at the desired level before it is transmitted by an antenna.

To meet EVM and spectral requirements of wireless standards (e.g. 3GPP), all electronic functions need to behave linear and should not yield any distortion of the transmitted RF signal 7. Furthermore the wireless transmitter also needs to be energy efficient. In analogue design these are typically conflicting requirements, yielding many compromises in the design of a wireless transmitter. Furthermore, the RF frontend 105 is typically realized making use of different semiconductor device technologies. E.g. CMOS for the digital base band parts, RF CMOS, SOI, or SiGe for the low power analogue parts of the RF frontend 105, while GaAs, LDMOS or GaN technologies are often used to implement the power amplifier 112 (when aiming transmitter power larger than 1 W). This yields low integration, high cost, and logistic problems. The inaccuracies that are always present in analogue circuits are the cause for LO leakage, poor image rejection, and as such demand complicated IQ calibration. Furthermore the analogue nature of the RF frontend 105, requires the use of (high) quiescent currents to achieve sufficient linearity. This results in significant power consumption in low traffic scenarios, or even in "off" mode operation. Typically the power amplifier 112 makes use of efficiency enhancement techniques, such as supply voltage modulation or Doherty operation to improve its efficiency in power back-off operation (PBO). However, also here the analogue nature of the circuits yields to imperfections and/or inaccuracies, which limits in practical situations both the achievable peak efficiency, as well as the efficiency in power back-off.

Recently Direct Digital to RF signal up-conversion techniques have been introduced to circumvent the problems and restrictions related to analogue transmitter implementations. These techniques are also revered to as RFDACs, or RF mixing DACs. When covering the complete digital transmitter (including the output power stage(s)) they are referred to as Digital (intensive) transmitter (DTX) or can also be referred to as a direct-digital RF modulator (DDRM).

Prior art digital transmitter (DTX) implementation so far have been almost exclusively restricted to a few watts RF output power. This allowed them to use very compact sizes for switch banks in their output stages (power amplifier 112). As such, these implementations can be considered electrically small in view of their operating frequency and suffer only to a limited extend from current redistribution effects that yield irregularities in their digital base band (e.g. due to codewords CWDs) to their RF output signal transfer. For this reason, prior-art DTX implementations are not so sensitive to their actual switch bank layout implementation and related TX unit cell activation. This drastically changes when aiming for higher power levels (i.e. more than 10 W). In such a high power implementation the realized switch banks are no longer electrically small compared to their operating frequency. Therefore, RF output current distribution effects occur due to the digitally controlled activation of its TX unit cells, severely degrading the quality of the CWD-to-RF output transfer (i.e. CWD-AM and CWD-PM transfer). These irregularities and disruptive behaviour in this transfer are very difficult to correct for by means of signal processing and/or a DPD arrangement. Therefore significantly limiting the achievable "noise floor" and spectral purity of the output signal of current generation of power DTX implementations.

SUMMARY OF THE INVENTION

The present invention seeks to provide a solution to a problem occurring in the digitally controlled segmented output stages of transmitters, relating to (RF) current distribution effects.

According to the present invention, a method as defined above is provided, comprising controlling segments by activating a specific segment using an activation scheme for activating specific ones of the segments depending on the code word CWD, the activation scheme starting from center ones of the plurality of segments towards outer ones of the plurality of segments for increasing code word CWD values. Furthermore, the segments are activated such that current redistribution during one RF cycle, due to the use of multiple activation moments to realize the RF output waveform (e.g. as used in a Cartesian set-up) are minimized.

These DTX segmented output stages can have a combination of thermometer coding (possibly at multiple levels) and or binary coding and can include several switch banks with unit elements or segmented power output stages (e.g. in Doherty configuration). A digital pre-distortion (DPD) arrangement can be used to correct for (remaining) linearity imperfections. Different from earlier DAC, ADC or DTX works, the invention targets not for the reduction of the absolute error (INL) of the CWD-to-RF output signal transfer delivered by the uncorrected segmented output stage/switch bank performance. In contrast, this invention targets to overcome the disruptive and irregular nature that occurs in the CWD-to-RF output signal transfer of prior-art DTX implementations (even if this comes at the cost of increasing somewhat the absolute error of the uncorrected switch bank performance). The CWD-RF output function is made as smooth and monotonic as possible. This is achieved by applying innovative activation schemes for the unit cells in the (electrically large) switch banks or segmented output stages of the DTX. Namely, by enforcing a strictly symmetrical activation, monotonic CWD-to-RF output signal transfer can be achieved. This monotonic behaviour, results in less memory effects and allows a strong reduction of the needed pre-distorter complexity and its related data interpolation algorithms, while it can still take care for correcting the absolute transfer errors, as such offering a significant reduced TX "noise" and higher spectral purity.

SHORT DESCRIPTION OF DRAWINGS

The present invention will be discussed in more detail below, with reference to the attached drawings, in which FIG. 1 shows a block diagram of a prior art generic transmitter having an analogue RF frontend;

FIG. 2 shows a schematic diagram of a generalized polar digital intensive transmitter (polar DTX);

FIG. 3 a) to e) show DTX signal representations for polar, unsigned Cartesian, signed Cartesian, constellation mapped (interleaved) signed Cartesian and (an eight phase) multi-phase/poly-phase implementation;

Figure 7:
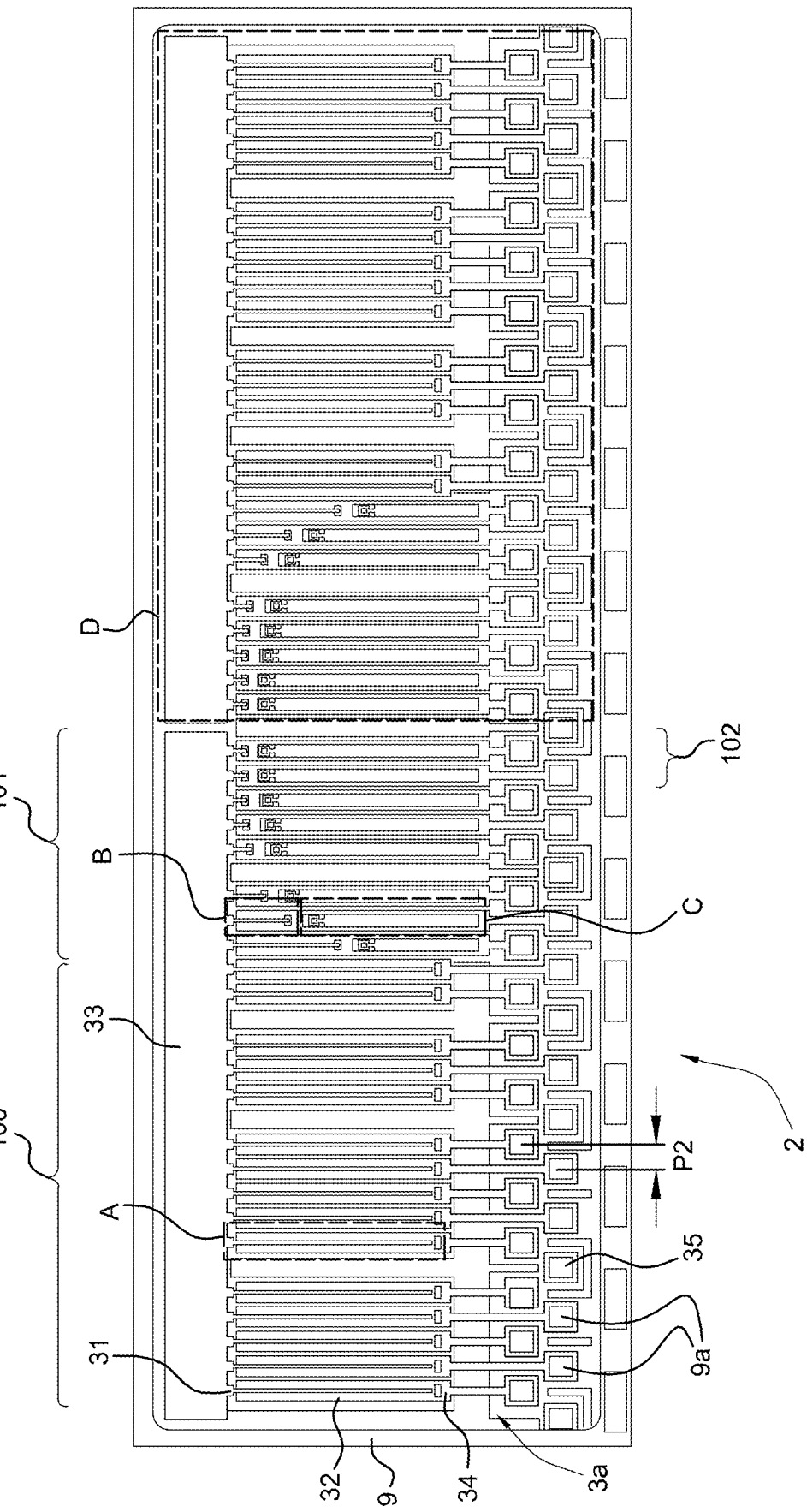
Figure 8:
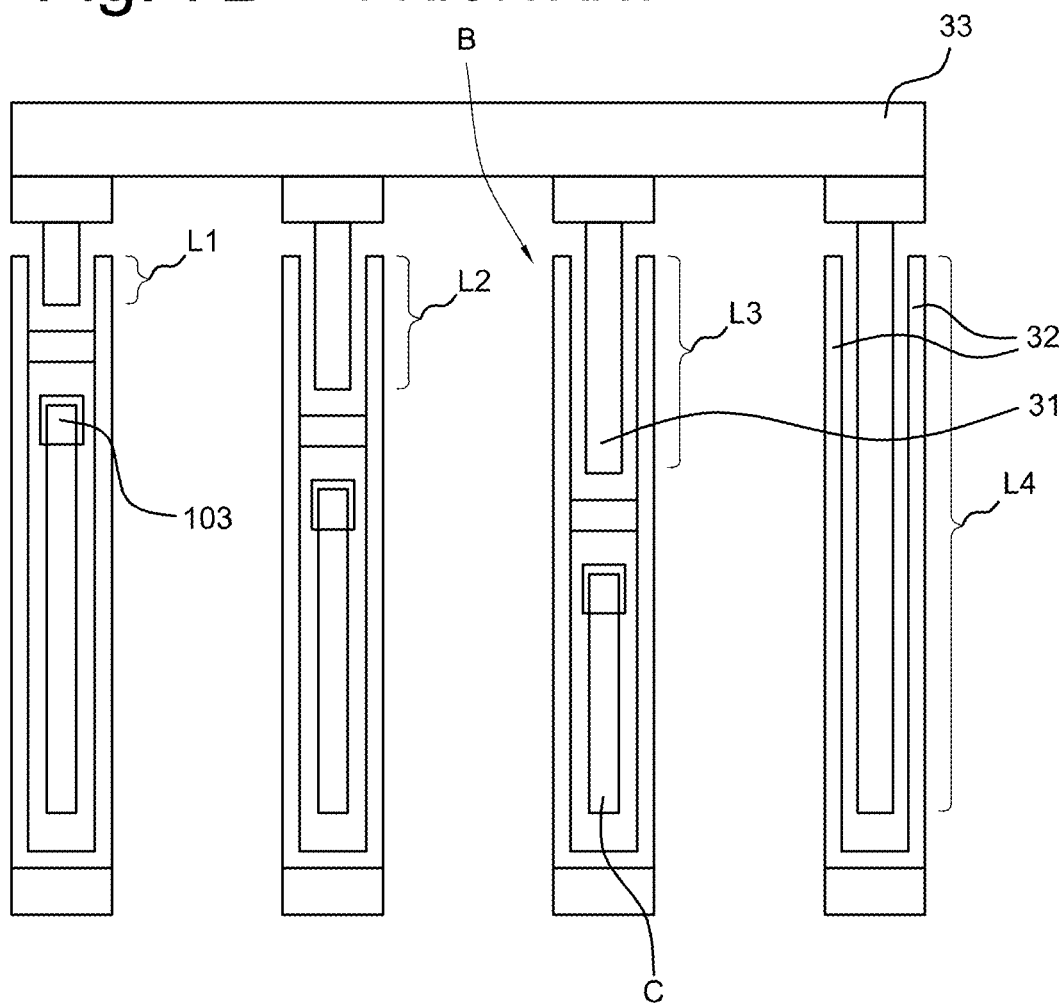
Figure 10:
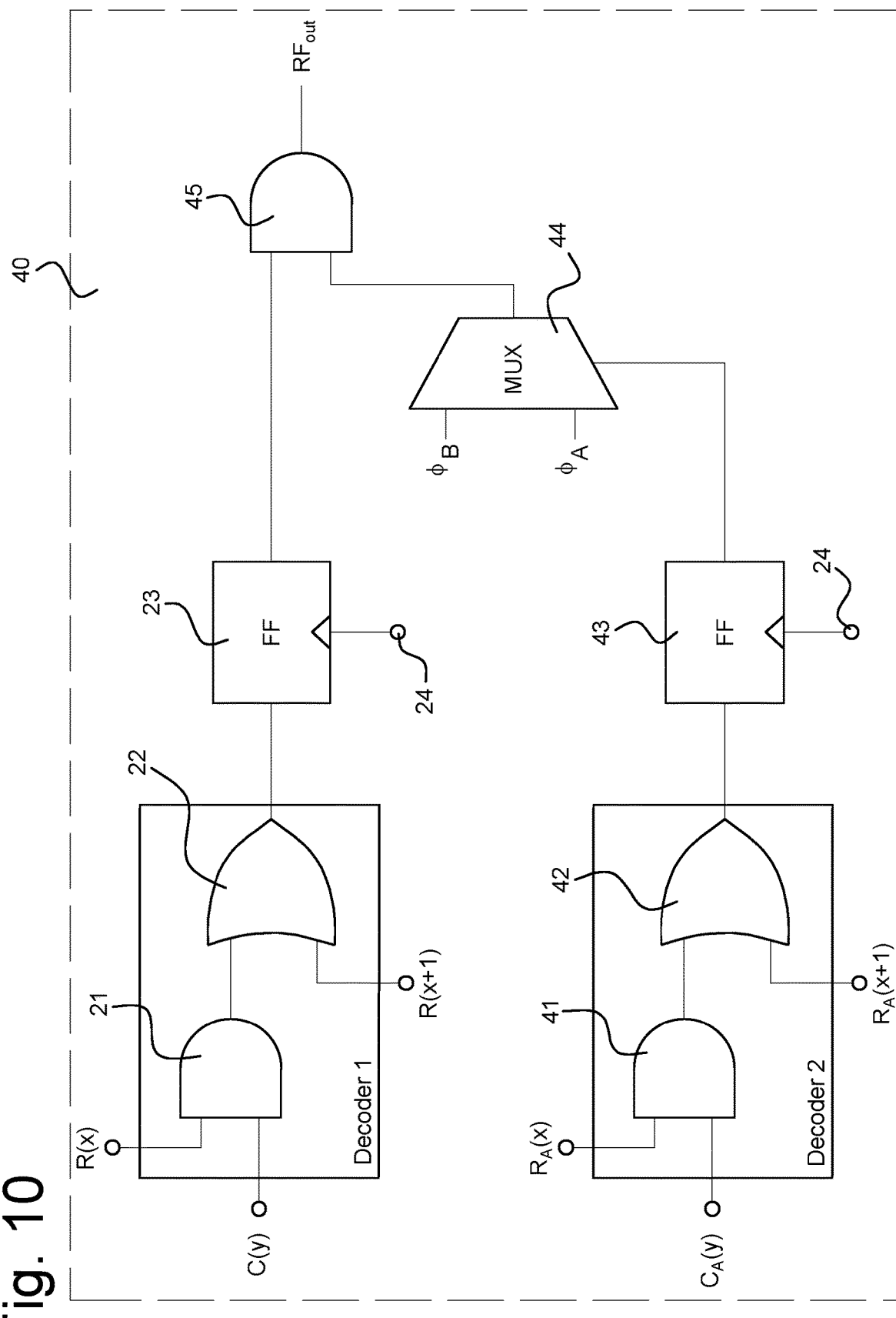
Figure 11:
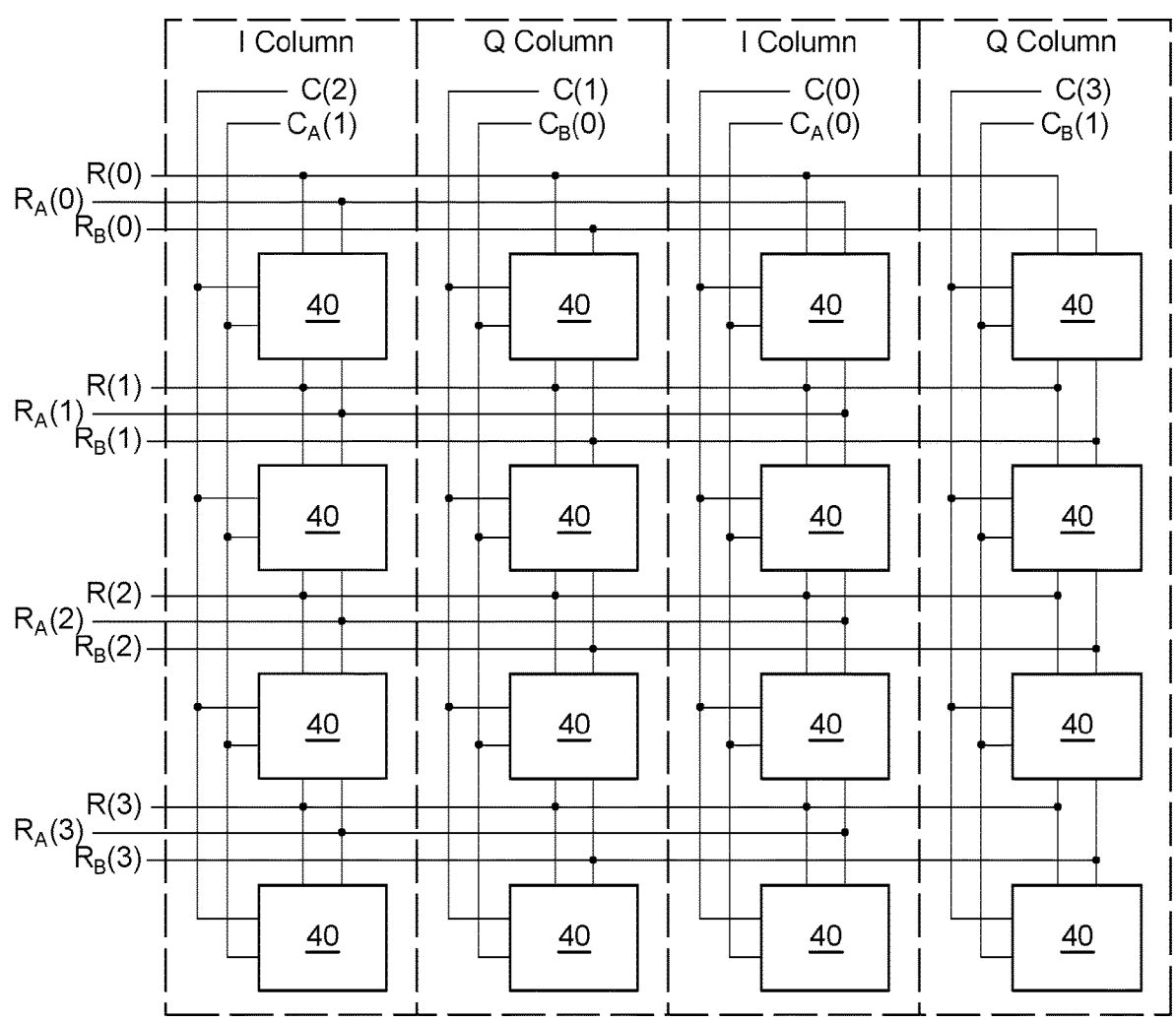
Figure 12:
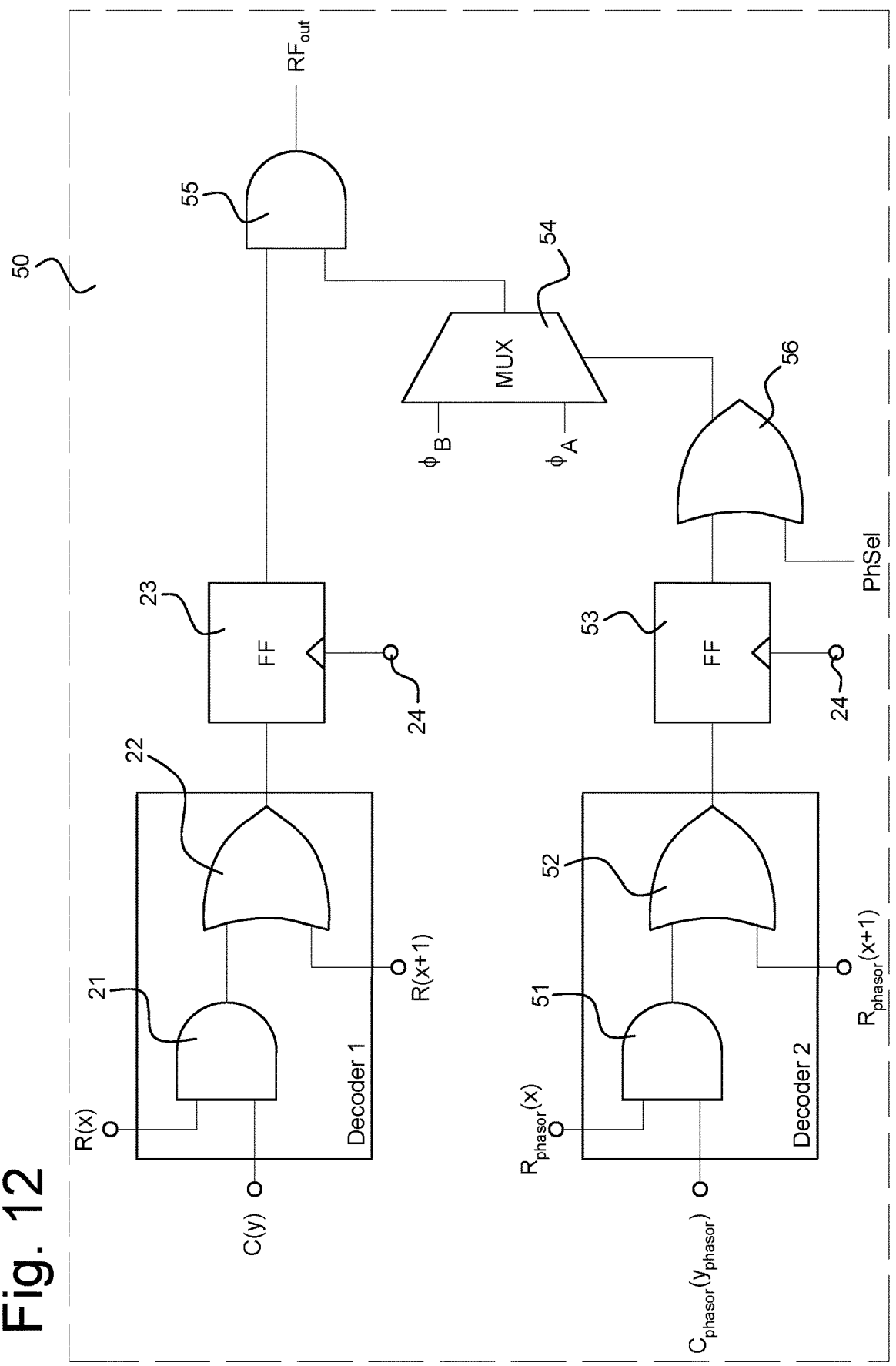
Figure 13:
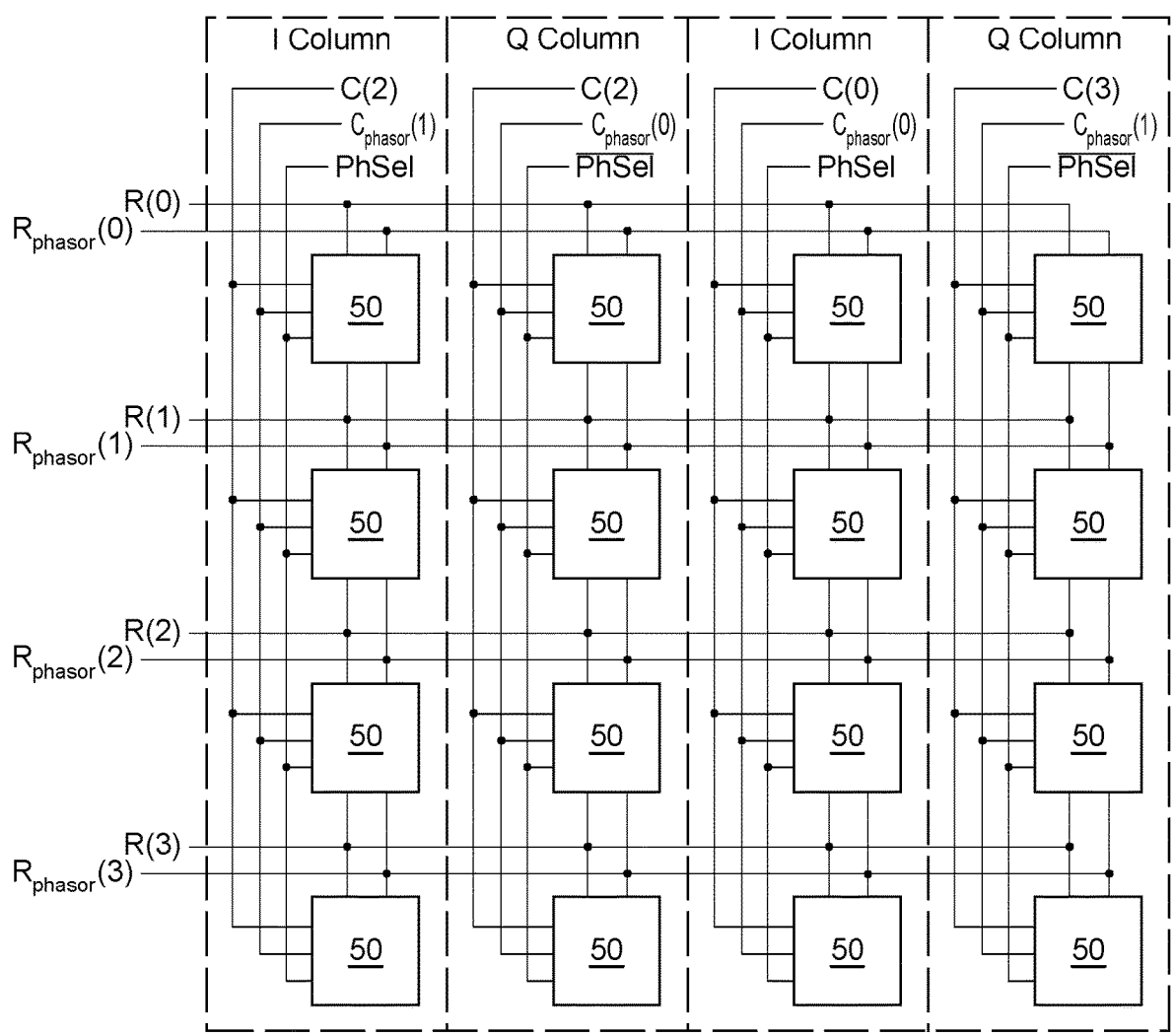
Figure 14:
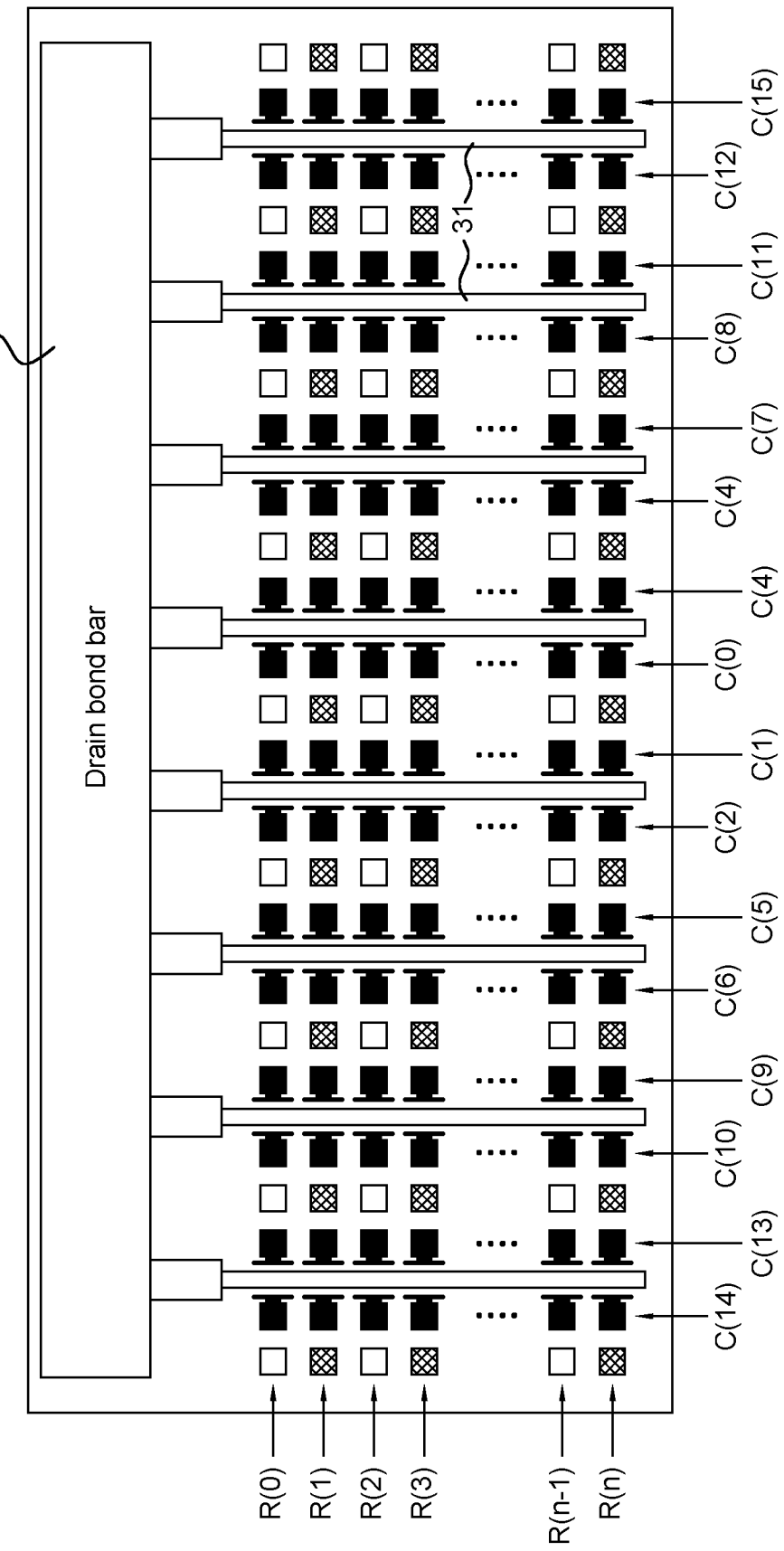
Figure 15:
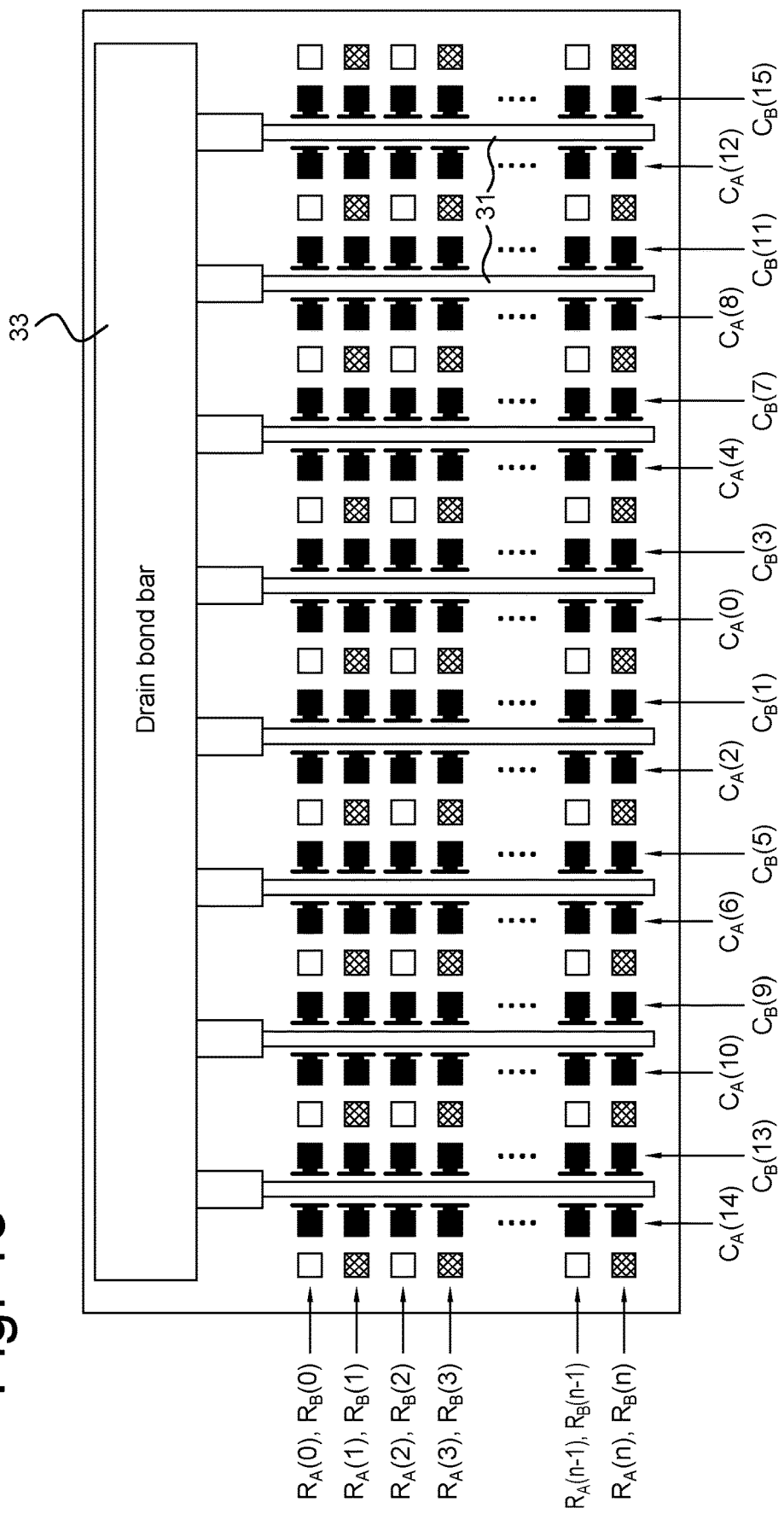
Figure 16:
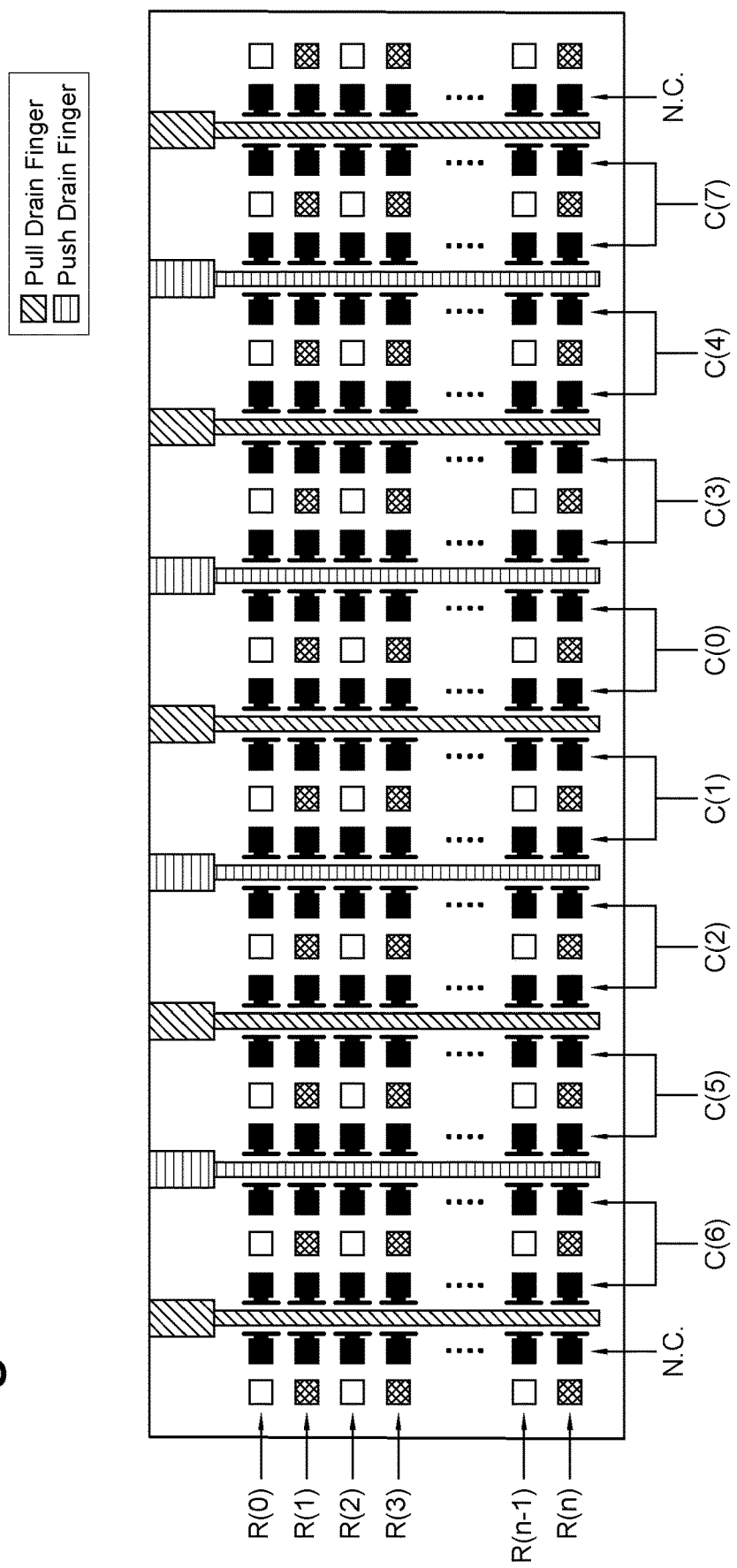
Figure 17:
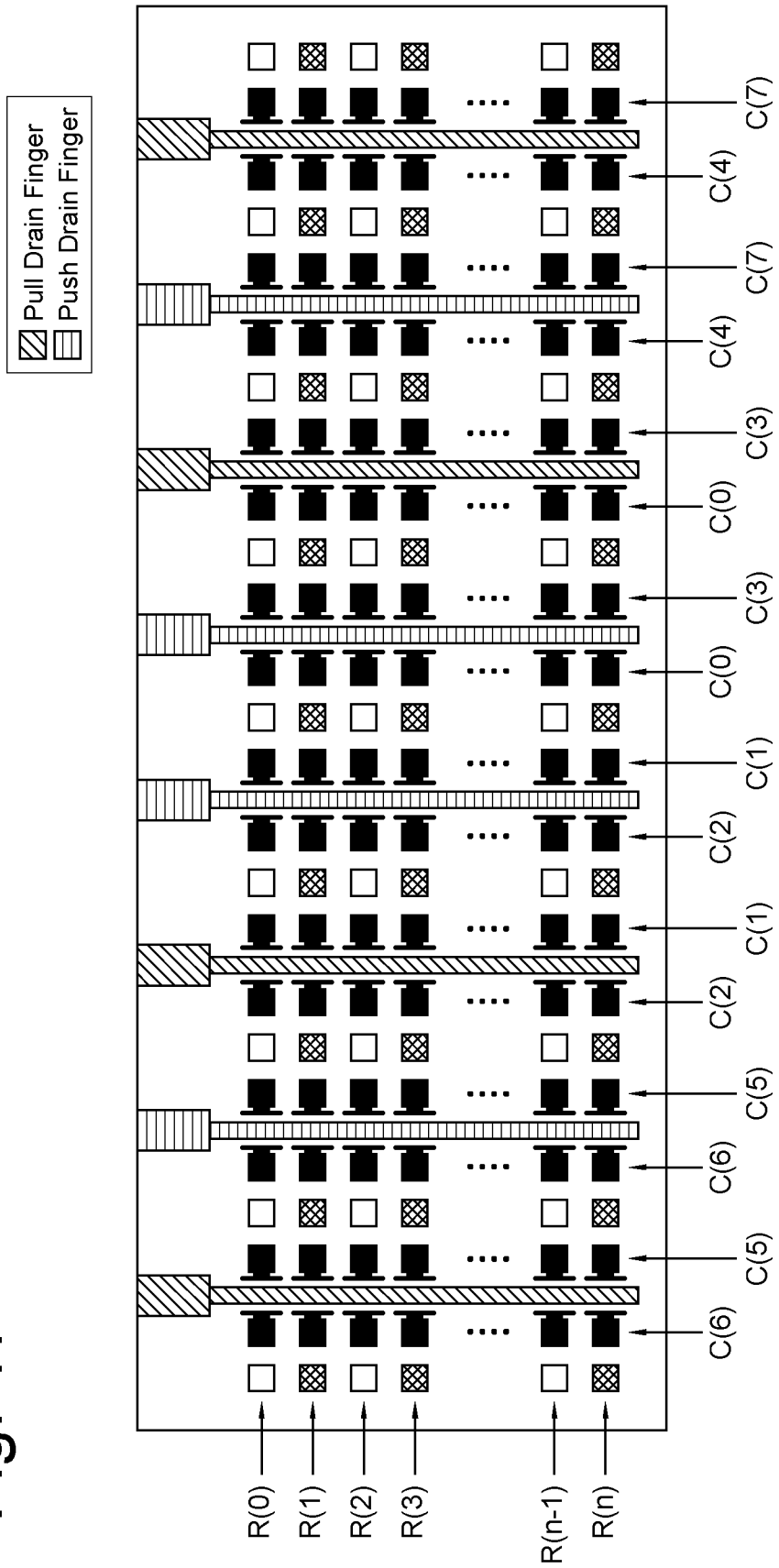
Figure 18:
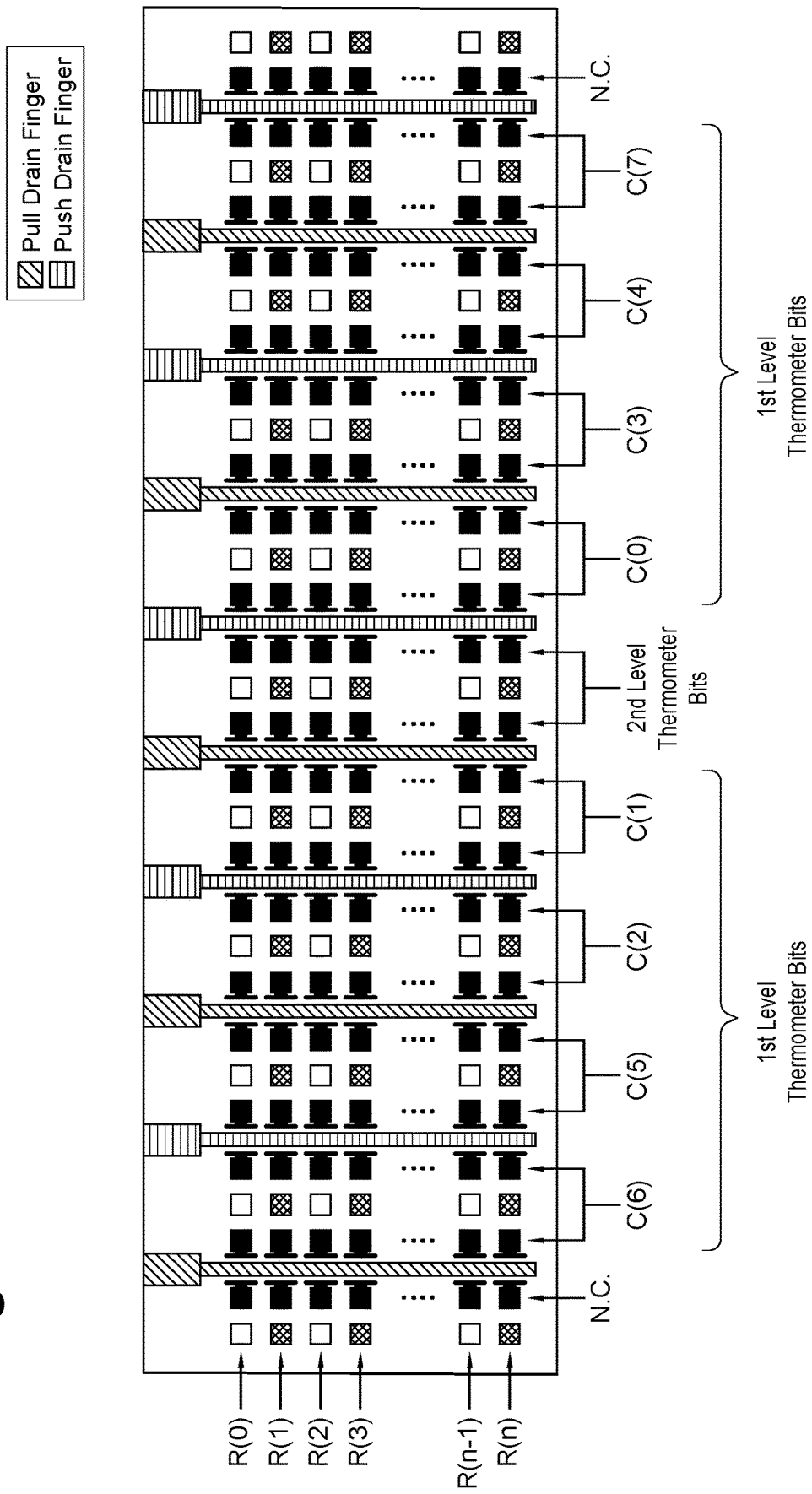

FIG. 7A-B show a top view and a detailed top views of a switch bank as used in an embodiment of a first generation digitally controlled segmented RF power transmitter;

FIG. 8 shows an example of a multi-phase output waveform using a 25% duty-cycle, where A=0.25 and B=0.70;

FIG. 9 shows a logic circuit diagram of a decoder circuit applied in present invention embodiments;

FIG. 10 shows a logic circuit diagram of a second decoder circuit applied in present invention embodiments;

FIG. 11 shows a schematic diagram of an array of second decoder circuits used to control the array of segments in a switch bank according to a further embodiment of the present invention;

FIG. 12 shows a logic circuit diagram of a third decoder circuit applied in present invention embodiments;

FIG. 13 shows a schematic diagram of an array of third decoder circuits used to control the array of segments in a switch bank according to a further embodiment of the present invention;

FIG. 14 shows a schematic diagram of a switch bank of a DTX according to an embodiment of the present invention;

FIG. 15 shows a schematic diagram of a switch bank of a DTX according to a further embodiment of the present invention FIG. 16 shows a schematic diagram of a switch bank of a DTX according to a push-pull embodiment of the present invention;

FIG. 17 shows a schematic diagram of a switch bank of a DTX according to a further possible push-pull embodiment of the present invention; and FIG. 18 shows a schematic diagram of a symmetric push-pull switch bank of a DTX according to a further possible push-pull embodiment of the present invention.

Figure 19:
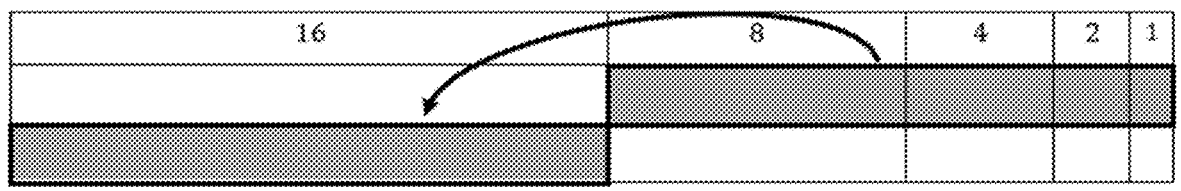

FIG. 19 shows how a fully binary implementation yields large current redistribution when large bits switch are turned on or off.

DESCRIPTION OF EMBODIMENTS

Digital intensive transmitters (or digital transmitters, DTX) are considered as candidate building blocks to implement new applications such as mMIMO 5G networks in a cost effective and energy efficient manner. Examples of such digital intensive power transmitters are described in patent application NL-A-2024903 of the same applicant (later published as WO2022169362A1), which is incorporated herein by reference. The present invention embodiments, as described herein with reference to a number of exemplary embodiments, aim for an optimum implementation of control of segmented power amplifier stages, in order to achieve a monotonic and smooth CWD-AM (code word to amplitude modulation) and CWD-PM (code word to phase modulation) transfer. These embodiments can still be combined with digital pre-distortion (DPD) methods/algorithms, but as the CWD-AM and CWD-PM transfer functions are monotonic and do not show humps or other irregularities, consequently DPD can be avoided, or the related DPD models of the transmitter or related data interpolation of this transmitter can be strongly simplified, while DPD can be applied more easily and more effectively.

To illustrate the advantages of the present invention embodiments, first the performance of a first generation power LDMOS switch bank layout as shown FIGS. 7A and 7B, that has been applied in a higher power/electrically large polar DTX architecture, is considered. The invention embodiments, although in principle also applicable to polar operation are particularly beneficial in Cartesian and/or multi-phase/poly-phase DTX implementations. In these concepts based on the input baseband $I_{bb}$ and $Q_{bb}$ signals the activation of unit cells/gate-segments in a (interleaved) switch bank configuration are controlled. It is this plurality of unit cells/gate-segments with different controlling clock phases (activation moments) that give rise to the occurrence of big irregularities or in more extreme cases, even non-monotonic behaviour. As such it is noted that the present invention embodiments are applicable in various DTX-operation modes, such as, but not limited to, polar, Cartesian, multi-phase/poly-phase operation, in their single-ended or push-pull implementations, while operating as standalone TX line-up or embedded within a Doherty or outphasing, or other efficiency enhancement TX line-up.

Figure 1:
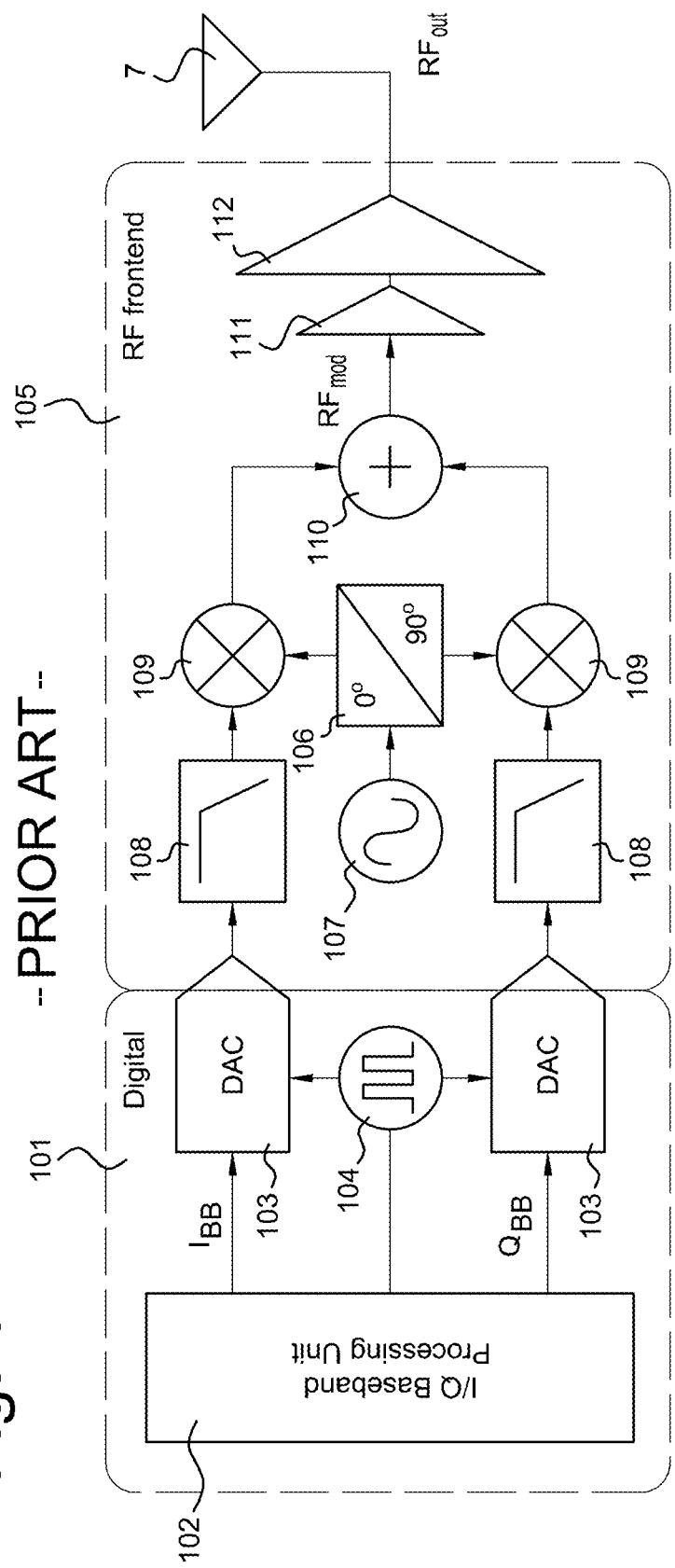
Figure 2:
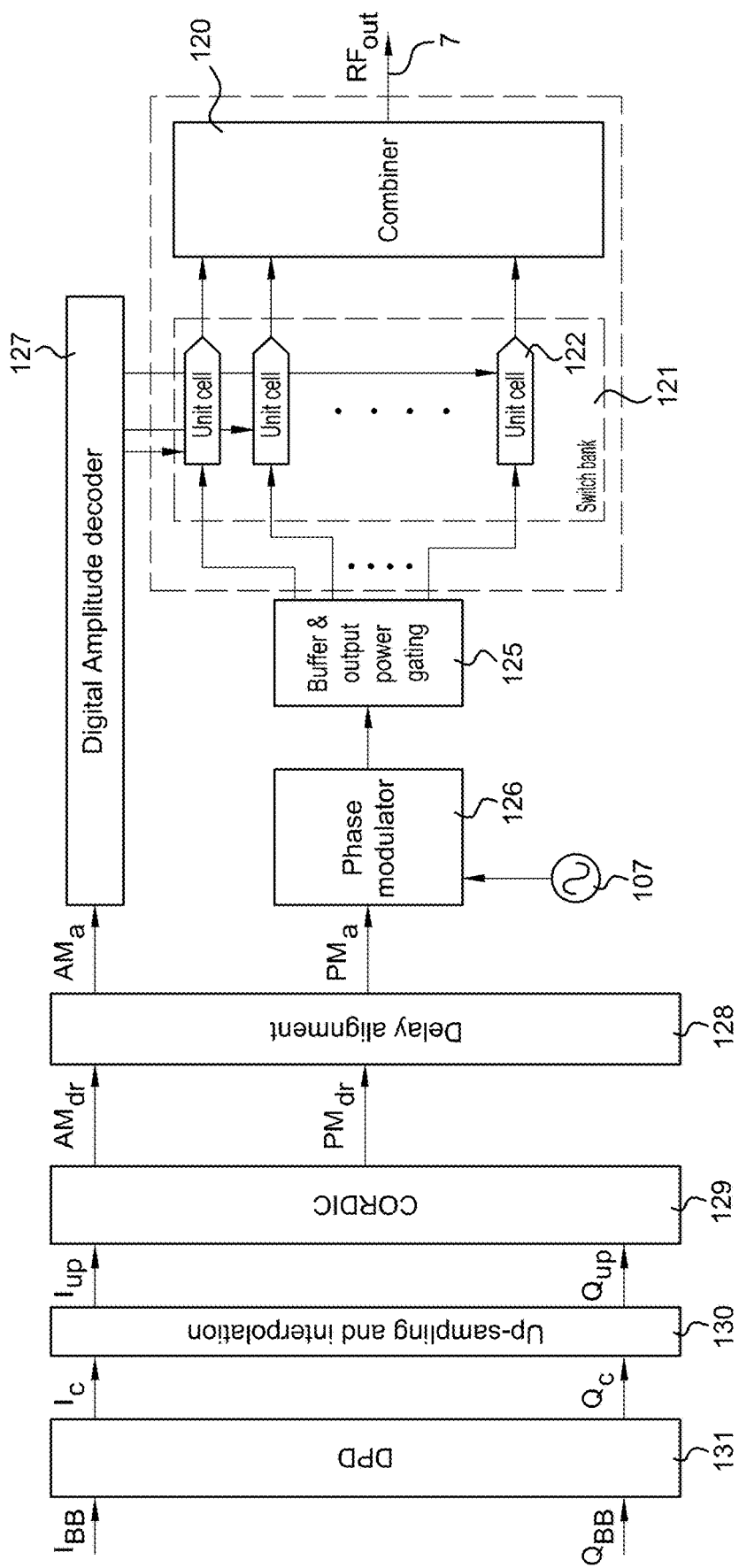

FIG. 2 shows a schematic diagram of a generalized polar digital intensive transmitter (polar DTX). In such a polar DTX architecture, depending on their exact nature (raw IQ data or already somewhat filtered and -resampled) the original $I_{BB}$ and $Q_{BB}$ data can be partly resampled and interpolated prior to be pre-distorted by the DPD unit 131, after which the resulting $I_c$ and $Q_c$ data is further up-sampled and low-pass filtered (the combination of up-sampling and filtering is also called interpolation/resampling) in an up-sampling and interpolation unit 130. Note that this sequence is often dictated by the computational speed constrains of the DPD unit. Next a CORDIC unit 129 takes the up-sampled $I_{up}$ and $Q_{up}$ data and transfers it from the Cartesian to polar signal representation. The resulting amplitude (AM or envelope ($\rho$)) and phase (PM or ($\varphi$)) digital signal representations are adjusted in their time alignment using delay alignment unit 128, in order to compensate for delay differences in the AM and PM signal paths, prior to recombining theme in an output "switch" bank 121. The resulting $AM_a$ signal is fed to digital amplitude decoder 127, which controls the number of activated output unit cells 122 in the switch bank 121. The output signals of the digitally controlled unit cells 122 are combined in the analogue domain using a power combining arrangement 120. The more unit cells 122 are activated, the higher the output current/power of the signal $RF_{out}$ 7. The $PM_a$ signal digitally controls a phase modulator unit 126, which adjusts a local oscillator signal from local oscillator 107 for its phase. The resulting phase modulated signal is fed to a buffer 125 that provides a "digital" phase modulated clock, which is used to drive the unit cells 122 in the output stage(s). The amplitude and phase information is (re)combined in the output stage, such that the amplitude, as well as, phase modulated output signal ($RF_{out}$) is constructed. Gating of the clock signal can be applied to save clock tree power in PBO conditions when not all unit cells 122 are activated. It is important for achieving a good output signal quality, that the resulting RF signal of the switch bank 121 is monotonic in nature and free of glitches or other disturbances such that it exhibits a smooth behavior. However, achieving this smooth behavior is often a challenge in practical implementations. The power combining arrangement 120, in combination with the output impedance that it will offer to the unit cells 122, and the control of the unit cells 122, will set the operation class of the output stage. Multiple of these switch banks 121 can be used in an efficiency enhancement concept like Doherty, provided that the proper phase and drive conditions for these switch banks 121 are in relation to the nature of the Doherty output power combiner used.

Polar transmitters offer advantages in terms of their efficiency and output stage power utilization, and they are relatively easy to correct for their imperfections due to their rather independent amplitude and phase behavior. This allows in many practical situations the use of a 2×1 dimensional DPD correction scheme (AM-AM and AM-PM) in DPD unit 131. Note that in the architecture shown, this "polar" correction is done using the IQ representation of the signal. In some architectures these corrections are done after the CORDIC. A clear disadvantage of the polar architecture, is the bandwidth expansion that occurs in transferring the original Cartesian baseband I and Q data to its amplitude (ρ) and phase (φ) representation (see Table 1 below). This requires the use of non-linear operations for the phase and magnitude that do give rise to such a bandwidth expansion. In practice this means that the bandwidths (sampling rates) that the phase modulator 126 and amplitude decoder 127 needs to provide are typically a factor (~5×) higher than that of the original baseband signal to be represented. This expansion yields sever constraints when working with very large bandwidth signals (e.g. higher than 80 MHz). More importantly, the delay difference(s) between the envelope and phase paths restricts the use of a signal with large modulation bandwidth, as it significantly affects the in-band linearly, as well as close-in spectral purity of the communication system. This is the reason why polar architectures are considered to be less suited for handling the latest upcoming communications standards, like the fifth generation (5G) of wireless networks, that aim to use modulation bandwidths as high as 400 MHz in sub-6 GHz systems.

| Polar | Cartesian | Signed Cartesian | Constellation mapping (for interleaved Cartesian) | Multi-phase or Poly-phase (8-phases case) |
|---|---|---|---|---|
| $\rho = \sqrt{I^2 + Q^2}$ $\varphi = \tan^{-1}\left(\frac{Q}{I}\right)$ | I + jQ | Vector amplitudes: \|I\| \|Q\| Phase selection: sgn(I) sgn(Q) | I' = I + Q Q' = I − Q | A = \|\|I\| − \|Q\|\| B = √2 min (\|I\|,\|Q\|) |

Figure 3:
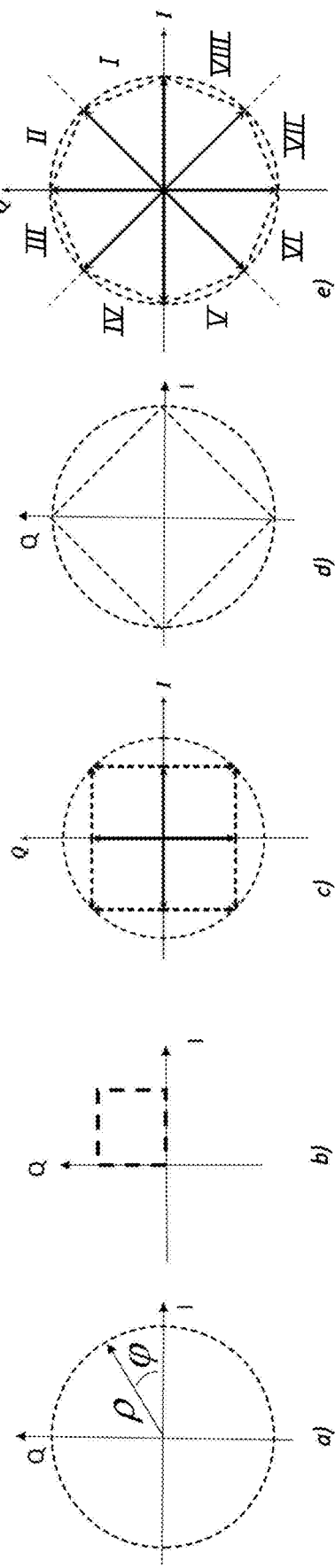

FIG. 3 a) to e) show DTX signal representations for polar, unsigned Cartesian, signed Cartesian, constellation mapped Cartesian and multi-phase implementations, which will be referred to in the description below. For the multi-phase implementation, the following table is an example for 8 phases:

| Octant | Logic expression | $\theta_A$ | $\theta_B$ |
|---|---|---|---|
| I | (I ≥ 0)∧(Q ≥ 0)∧(\|I\| ≥ \|Q\|) | 0 | π/4 |
| II | (I ≥ 0)∧(Q ≥ 0)∧(\|I\| < \|Q\|) | π/2 | π/4 |
| II | (I < 0)∧(Q ≥ 0)∧(\|I\| < \|Q\|) | π | 3π/4 |
| IV | (I < 0)∧(Q ≥ 0)∧(\|I\| ≥ \|Q\|) | π | 3π/4 |
| V | (I < 0)∧(Q < 0)∧(\|I\| ≥ \|Q\|) | π | −3π/4 |
| VI | (I < 0)∧(Q < 0)∧(\|I\| < \|Q\|) | −π/2 | −3π/4 |
| VII | (I ≥ 0)∧(Q < 0)∧(\|I\| < \|Q\|) | −π/2π | −π/4 |
| VIII | (I ≥ 0)∧(Q < 0)∧(\|I\| ≥ \|Q\|) | 0 | −π/4 |

Figure 4:
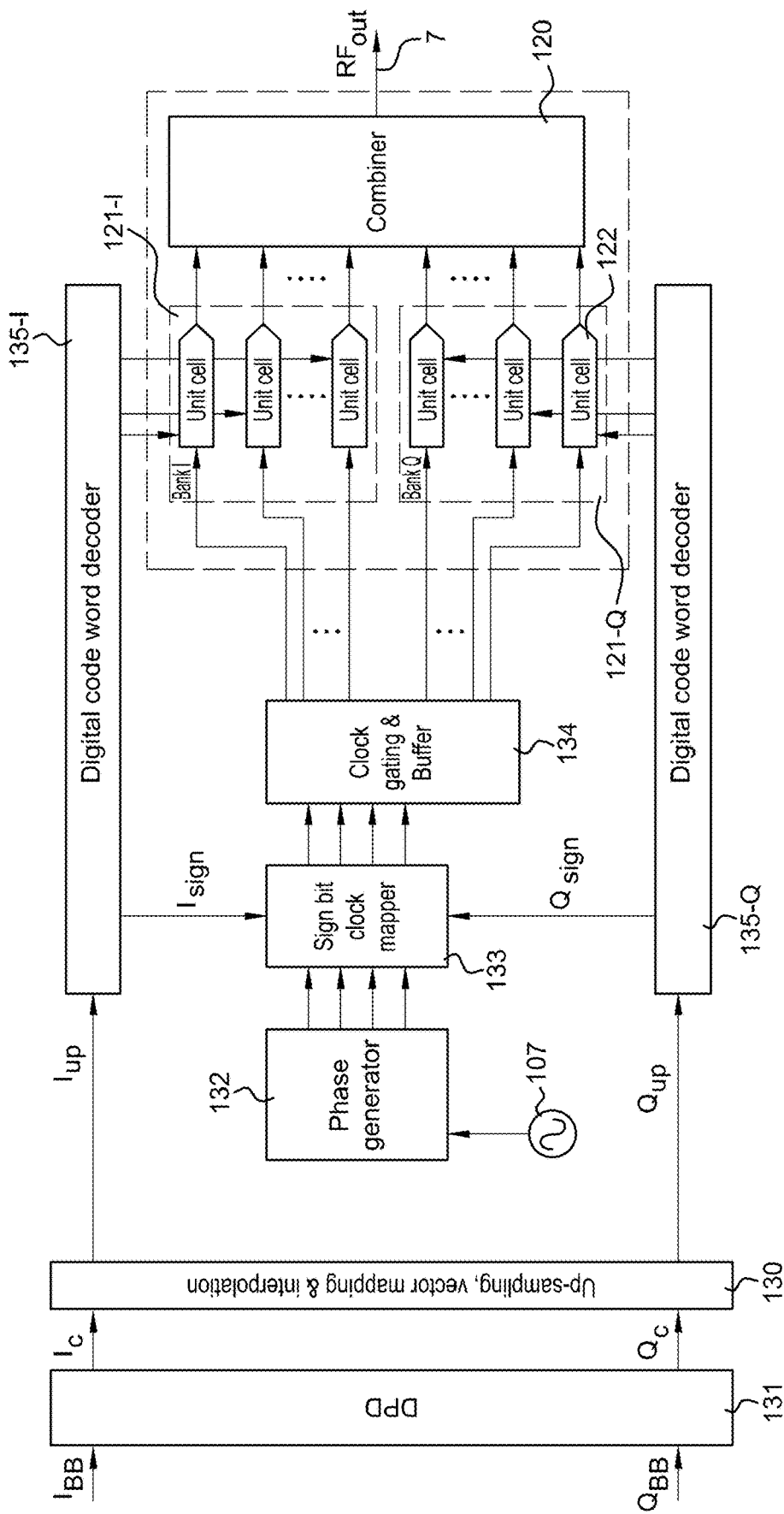
FIG. 4 shows a block diagram of a Cartesian digital intensive transmitter (Cartesian DTX)

FIG. 4 shows a block diagram of a Cartesian digital intensive transmitter (Cartesian DTX). To overcome the bandwidth constraints of the polar DTX architecture, the Cartesian DTX architecture is recently attracting more attention when targeting wideband applications (e.g. modulation bandwidth >80 MHz).

Cartesian (I/Q) [Alavi, MTT 2012] and multi-phase DTX are typically considered to be superior over their polar counterparts in terms of bandwidth, since they are based on linear (vector) summing rather than the use of non-linear equations, which (to some extent) avoids bandwidth expansion as found in polar systems. Closer inspection shows that this is definitely true for unsigned Cartesian operation. However, for signed Cartesian and multi-phase operation, switching between clock phases is used to select the proper quadrant/sector (i.e., the signed I/Q TX requires clock phase modulation). This switching between clock phases, can also be considered as wideband phase modulation, that also introduces bandwidth expansion, however, in stark contrast with polar this is done in a synchronized clocked regime, which allows a much more simple implementation of the related phase mapper (very low-resolution phase modulator, implemented using clock selection) than in the polar case, which needs a continuous changing phase. First the Cartesian concept will be explained, which is later generalized to the multi-phase concept. Multi-phase operation was first reported in [Matsuura, 2011] and [Wang, 2010]

In a Cartesian DTX (see FIG. 4) the $I_{BB}$ and $Q_{BB}$ data can be pre-distorted by a DPD unit 131, after which it is further up-sampled and interpolated in up-sampling and interpolation unit 130. The up-sampled $I_{up}$ and $Q_{up}$ are provided to digital code word decoders 135-I and 135-Q, that transfers the original (binary) code words ($I_{up}$ and $Q_{up}$) in a (thermometer) form suitable to control the activation of the unit cells 122 in the I switch bank 121-I and Q switch bank 121-Q. Note that using thermometer coding, glitches and mismatch in the electrical performance of the unit cells 122 can be reduced. To achieve higher efficiency, signed Cartesian operation is typically used. In contrast to unsigned I/Q operation, which avoids clock phase switching (see FIG. 3 *b*) and *c*)), in signed Cartesian operation, when the intended output signal is zero, no unit cells 122 will be activated. As such signed Cartesian operation shows an efficiency behavior that is similar with class-B, this in contrast to unsigned Cartesian operation, which has an efficiency behavior or similar to class-A operation.

In the signed I/Q DTX configuration, the local oscillator signal from local oscillator 107 is converted by the phase generator 132 in four clock signals that have (constant) 90 degree phase shifts relative to each other ([Alavi, ASSCC 2011]). As such these clocks are equally distributed over 360 degrees, or in other words, equally distributed over the RF period of the TX carrier frequency. These (phase shifted) clocks are needed to addressed, using a sign bit clock phase mapper 133, the 4 quadrants. This quadrant selection is controlled by the I and Q sign bits ($I_{sign}$ & $Q_{sign}$). The resulting phase swapped clocks from the sign bit clock phase mapper 133 provide the desired activation moment in the RF cycle for the unit cells 122 in the switch banks 121-I and 121-Q, via the clock gating and buffer unit 134.

Different than for a polar system, in which the CORDIC controlled phase modulator 126 provides a "continuous" (gradual) changing phase, Signed Cartesian operation is characterized by switching at synchronized times between the four (constant phase) clock signals. Another advantage is that the I and Q signal paths are identical in hardware nature, as such timing misalignment between them is small compared to polar DTX. This, combined with its synchronized nature, allows retiming of the clock tree signals, as well retiming of the (up-sampled) base band information. This allows to reduce the impact of delay mismatches and other timing inaccuracies in practical implementations.

Nevertheless, I/Q and multi-phase DTXs (see Table 1 and FIG. 3) suffer from (signal) interaction between the activated unit cells in their switch banks. This is mostly caused by the simultaneous use of different clock phases (both "on") in the activation of their PA unit cells 122 within one RF cycle. This interaction is typically most severe at higher power levels, where the large number of activated unit cells 122 in the switch banks 121 cause a drop in the effective output impedance of the switch bank 121. This yields to the situation that switch bank's electrical behavior starts to deviate from that of a current source, making it susceptible to interactions between the cells 122 activated by the different phases. This gives rise to poor I/Q image rejection and other sources of signal distortion.

Use of non-overlapping clocks in DTX switch bank operation in Cartesian [Alavi MTT 2014] and multi-phase transmitters, can significantly lower these interactions. By using only one clock-phase at the time in the activation of the PA cells 122. In Cartesian operation this non-overlapping condition results in a duty-cycle of 25% or less for the activation of the unit cells 122 in the switch bank(s) 121. For multi-phase operation using non-overlapping clocks, this required duty-cycle becomes even shorter (e.g. 12.5% in an eight-phase DTX). This use of (very) short duty-cycle clocks comes with implementation challenges at higher operating frequencies (e.g. above 3 GHz). Therefore, the use of overlapping activation clocks can be still beneficial for these multi-phase DTX concepts.

Figure 5:
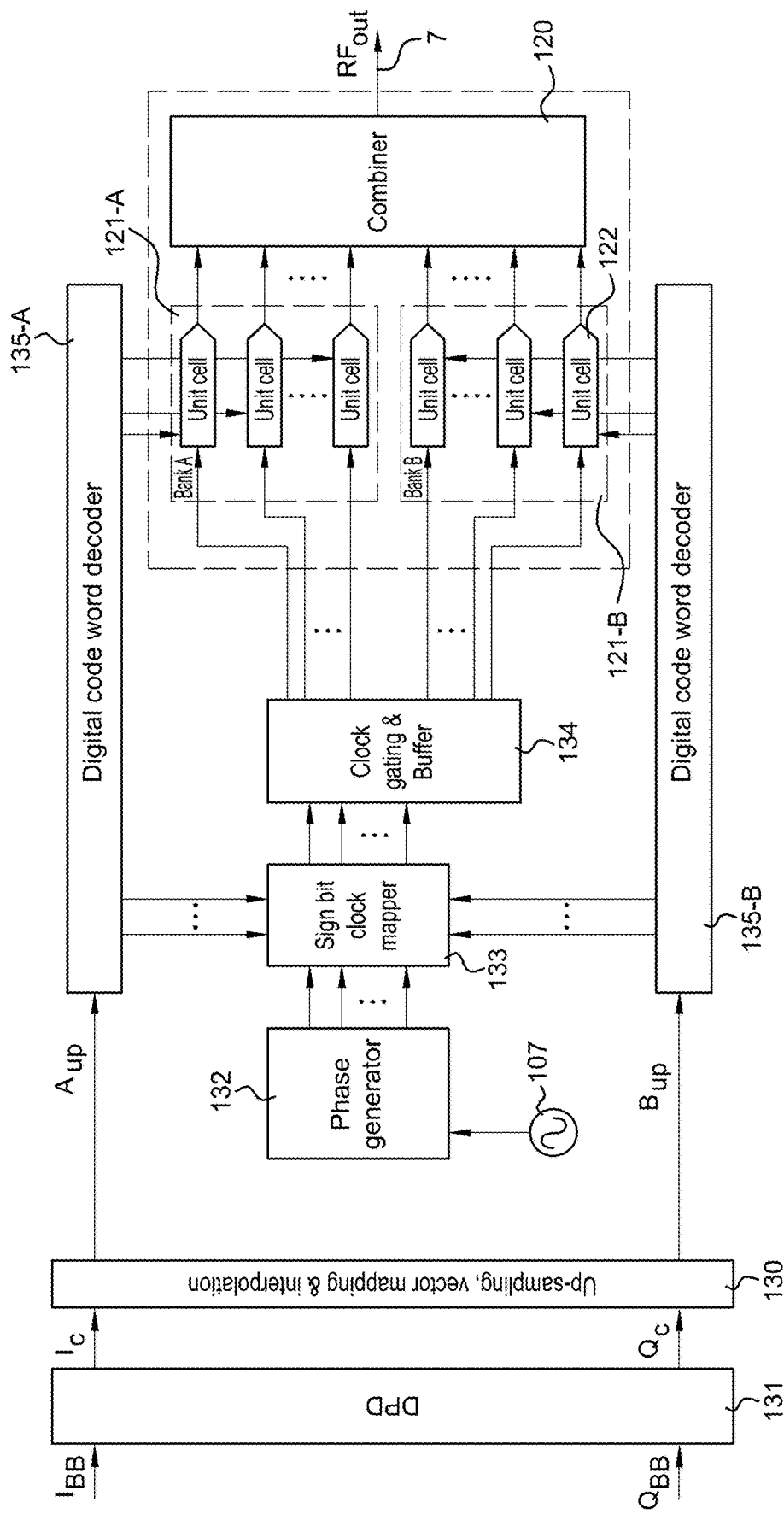
FIG. 5 shows a block diagram of a Multi-phase digital intensive transmitter (multi-phase DTX)

FIG. 5 shows a block diagram of a Multi-phase digital intensive transmitter (multi-phase DTX). Multi-phase systems use more than the 4 phases in the Cartesian DTX to drive the unit cells 122 in their switch bank(s) 121. In particular the use of 8 phases seems to be a suitable number (see FIG. 3 *e*)). The use of more phases, (e.g. 8-phases or 16 phases) allows the use of a smaller phase angle difference between the clocks driving the switch bank(s) 121. As consequence, the resulting analogue "vector" summation is less perpendicular (e.g. 45 degree) than in the Cartesian case (90 degree). This lower phase difference in the signal summing increases the efficiency for off-axis constellation points (compared to Cartesian DTX), and when using many phases (e.g. 16 or more) approaches the efficiency of a polar system. In addition, since the summed "vectors" are more "aligned" in their direction, less severe undesired interactions happen between the activated unit cells 122 outputs operating on different phases compared to Cartesian, yielding a more perfect summing of their generated output signals. Therefore, if the phase difference is limited (e.g. 45 degree or less) some overlap in the activation clocks that drive the unit cells 122 in the switch bank 121 can still be accepted. Consequently, in practical multi-phase concepts a trade-off can be found between lower interaction (higher linearity & efficiency) and output power. This can also be balanced between technology constraints in switching speed and output power. However, in both Cartesian and multi-phase DTX implementations the duty-cycle used in clocking the unit cells is best kept well below 50%. In particular the use of a 25% clock duty-cycle is considered as a good compromise in terms efficiency and output power capability. It can be shown that 33% duty cycle also offers specific advantages, in terms that a low $3^{rd}$ harmonic content output is provided.

As to the switch bank 121 and unit cell 122 organization and activation in polar DTX, the following observations can be made. In a single-ended polar DTX all the unit cells 122 share the same phase modulated "digital" clock for controlling their activation moment and duration of this activation. This duration is typically set by the duty-cycle of this phase modulated clock. When using class-B or class-C like operation, the use of a shorter duty-cycle is beneficial in achieving higher peak efficiency (e.g. for a square wave with a duty-cycle of 50%, the theoretical peak efficiency when all harmonics of the output stage are shorted is 63.6%, while for a duty-cycle of 25% this has increased to 90% [W. Gaber ESSCIRC 2011 and W. Gaber TMTT 2017]). Since all unit cells 122 use the same clock signal, only one switch bank 121 is required as shown in FIG. 2, and the clock tree is relatively straightforward, however, practical implementations might suffer from glitches and non-monotonic behavior in their CWD-AM and CWD-PM transfer, due to the imperfections in the realized thermometer and/or binary bits (e.g. device matching and or current redistribution effects), that yields errors in both amplitude and phase of the resulting overall output signal. Note that the CWD-to-RF output (its integral nonlinearity (INL)) is preferred to be monotonic.

To improve on spectral purity of a DTX configuration, it is often considered to be beneficial to favor push-pull over single-ended operation. This due to the inherent rejection of even harmonic products as well as suppression of substrate and noise supply in push-pull architectures. In such a configuration also the clock tree is typically implemented in a complementary or (pseudo) differential configuration. Consequently, in the push-pull polar DTX architecture typically not 1 but 2 phase modulated "digital" clocks are used for the activation of the unit cells 122. To implement the push-pull output stage, two separate switch banks 121 or one push-pull oriented switch bank 121 that are connected to a differential power combiner 120 or balun can be employed.

Note that in a polar system the sum of the total output current/output power of the unit cells 122 set also the peak output current/power capabilities of the polar DTX. Since all unit cells 122 are driven by the same phase (or in push-pull configuration by two 180 degree shifted phases), the current/power utilization of the unit cells 122 in a polar architecture is the highest of all DTX configurations. Therefore, the related (summed) output capacitance and losses of the unit cells 122 in this configuration is the lowest for a given output current/power for all DTX configurations.

To reduce the DC power needed for the clock tree and its related buffers, dynamic clock tree activation can be used. In such an approach, based on the amplitude code words that control the unit cell 122 activation, also the clock signals to these unit cells 122 can be activated or omitted [Alavi TMTT 2014]. This output power based clock tree activation (hereafter referred to a as clock gating), helps to improve the overall efficiency of a DTX in output power back-off (PBO) conditions.

As to the switch bank 121 and unit cell 122 organization and activation in Cartesian and multi-phase DTX, the following observations can be made. The first generation of Cartesian DTX made often use of one interdigitated, or two separated push-pull switch banks 121 (FIG. 4). In these designs the unit cells 122 of these banks 121 are always performing an "I"/"Ī" operation or a "Q"/"Q̄" operation, and cannot dynamically change to another clock phase [Morteza, 2014]. In such a configuration, when operating on the I or Q axis (see FIG. 3 *c*)), e.g. let's assume maximum operation along the "I axis", all "I"/"Ī" cells are "on", while all "Q"/"Q̄" cells are "off". Consequently, when comparing the Cartesian DTX using separated I and Q cells 122, with the polar DTX case, twice the amount of unit cells 122 are needed to provide the same peak output capability along the I and Q axes (assuming that the unit cells in both DTX concepts are equal in terms of output current/power). For a Cartesian DTX using this concept, this yields twice the output capacitance and output losses, raising efficiency and bandwidth restrictions for practical implementations compared to a similar Polar architecture.

In a multi-phase DTX using also separate sets of unit-cells 122 to operate on the active phases (A and B), yields comparable considerations as for Cartesian DTX above.

Figure 6:
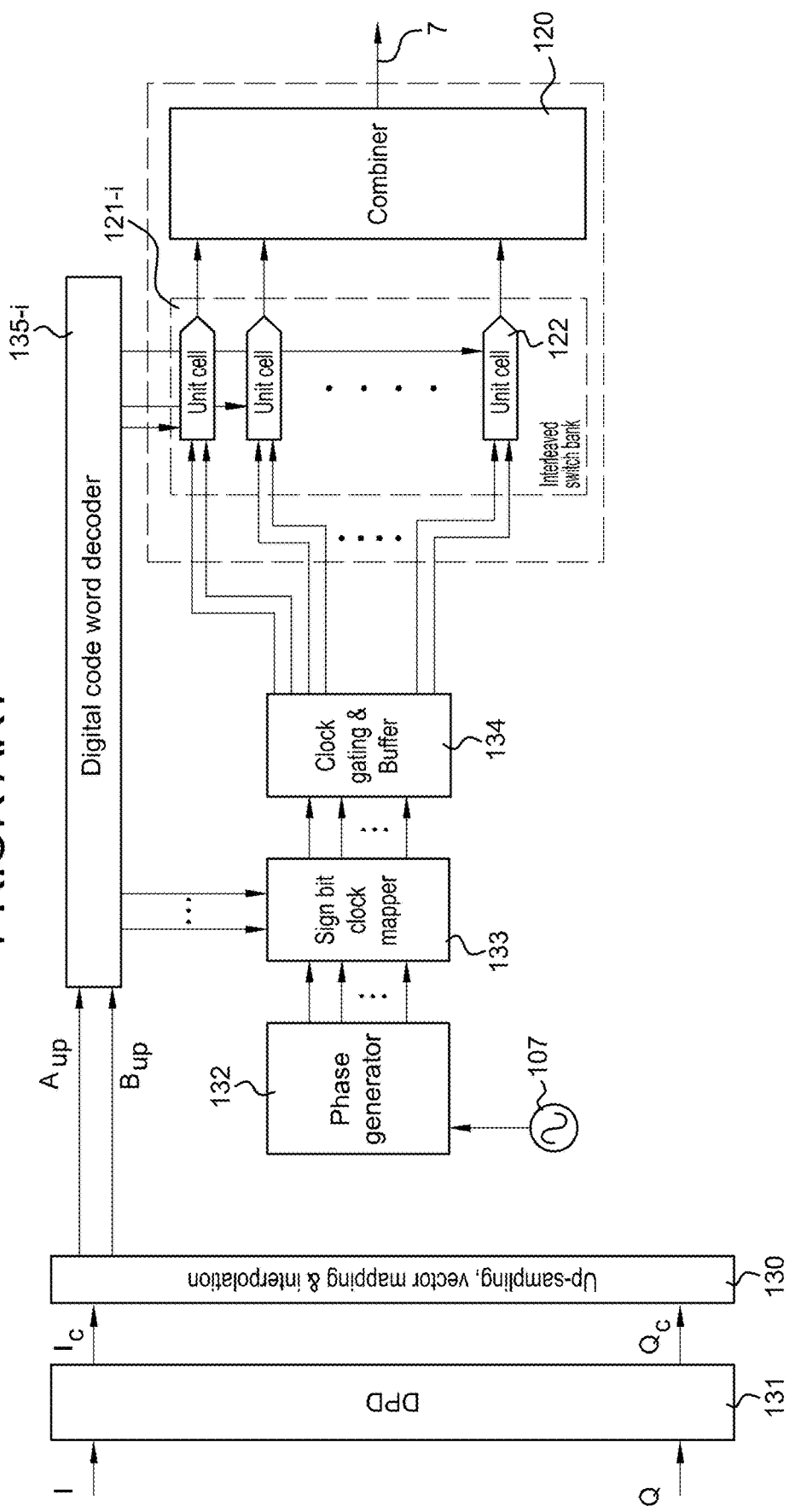
FIG. 6 shows a block diagram of an interleaved (generalized multi-phase) digital intensive transmitter (interleaved DTX)

To overcome the disadvantage of the poor output stage current/power utilization in the Cartesian and multi-phase approach featuring two separate switch banks 121 (Interleaved switch bank 121-*i*) operation was introduced [Jin ISSCC 2015, Mehrpoo RFIC2017]. FIG. 6 shows a block diagram of an interleaved (generalized multi-phase) digital intensive transmitter (interleaved DTX), wherein components/units with a similar function as in the FIG. 5 block diagram have same reference numerals.

In an interleaved configuration only one (push-pull) switch bank 121-*i* is used, in which its unit cells 122 can be activated by "any" of the offered clock phases in order to represent an I, Q, (Cartesian) signal, a I',Q' (mapped Cartesian) or to represent an A or B signal (multi-phase). This allows all the unit cells 122 to be used for I or Q (or, similarly for I' or Q', or for A or B) if desired. Such a configuration can better approximate the polar case in terms of efficiency or output power, when the maximum power out conditions of the constellation diagram are arrange such that they occur along the I and Q axes or the phases used for driving the A and B banks.

In Cartesian operation this can be achieved by using a constellation mapping (see Table 1 and FIG. 3 *d*)). E.g. by using a mapped representation for I and Q, namely I'=I+Q and Q'=−I effectively a 45 degree rotation of the original IQ diagram is achieved [Shen, RFIC 2020]. This mapping has as the advantage that for the largest amplitude (the outer corners of the constellation diagram) all unit cells 122 are activated by either only the I' clock or Q' clock. This allows a factor $\sqrt{2}$ reduction of the required output stage current (or number unit cells) to reach the same peak output power level in comparison with a comparable "conventional" Cartesian DTX configuration. Furthermore, also the IQ interaction has been somewhat reduced, due to the fact that for the highest output powers the unit cells 122 share the same driving phase. Note that also multi-phase DTX concepts using interleaved operation for their unit cells 122 benefits from comparable considerations, although here there is no need to rotate the original IQ constellation diagram. Namely, also they show the highest output current/power along their activation axes (FIG. 3). Note, that both Cartesian and multi-phase DTX implementations are still worse than polar, when using condition that are close to |I|=|Q| or |A|=|B|, due to phase difference between the related clocking signals, as well as, the resulting overall increased effective duty-cycle of the combined output signals, which lowers the efficiency. The output losses and output capacitances of the switch bank 121 for an interleaved Cartesian implementation, compared to a traditional Cartesian implementation using separate I and Q banks are however reduced by a factor $\sqrt{2}$ and as such closer to that of polar DTX solution implemented in the same technology.

Interleaved switch bank 121/unit cell 122 operation is in literature often implicitly associated to the use of non-overlapping activation clocks [Wentzloff, 2019]. As stated before, non-overlapping clocks are expected to provide lower IQ interaction between the activated unit cells 122, when implemented correctly. For a Cartesian system this would require the use of 25% duty-cycle clocks to obtain the activation signals for the unit cells 122. When considering multiphase systems even smaller clock duty-cycles need to used, to guarantee non-overlapping conditions in the activation of the unit cells 122. Namely, a 12,5% duty-cycle (or less) is needed when using 8 phases. However, using such a low duty-cycle (although beneficial for the theoretical efficiency), also limits the output power capabilities of the interleaved bank (a factor ~2.5 lower compared to 50% square wave duty-cycle operation). In addition, the clock tree and cell activation using short duty-cycle operation becomes increasingly more challenging at higher operating frequencies (e.g. 3 GHz).

For these reasons it might be still beneficial to use somewhat higher duty-cycle clocks in the multi-phase DTX case (e.g. 25%). Although in this situation again overlapping clocks are present, the reduced phase angle between the activated unit cells 122 tends to lower their interactions, while the composite duty-cycle (phase angle difference+ applied duty-cycle) can be still low enough (well below 50%) to achieve good efficiency with good output power.

Note that the use of overlapping clocks is still possible within one interleaved switch bank 121. Since on the axes between the segments, all unit cells 122 will be using the same activation phase. While in the in-between situations on the outer contours of the segments the switch bank unit cells 122 are driven by one, or the other active driving phase, with their ratios gradually changing when traveling between the segment axes. A unit cell 122 is driven either on the I/A clock or the Q/B clock (Cartesian/multi-phase case). Since, when driven by multiple phases within one RF cycle the RF output contribution of a unit cell 122, would not scale perfect, since the unit cell 122 itself still needs non-zero time to switch on or off. As such, even with non-overlapping clocks, using one unit cell 122 (for example in a constellation mapped Cartesian DTX) to first represent I', and next Q', within one RF cycle, would give a different result than having one unit cell 122 to represent I' and other unit cell 122 Q' in the same RF cycle. In summary, the available unit cells 122 in an interleaved switch bank 121-I can be allocated to the I' or Q' (constellation mapped Cartesian) or to the A or B phases (Multi-phase) or can be inactive. In a push-pull implementation, a unit cell can be thought of one push element and one pull element, with shared activation logic. Logically in the next RF cycle their clock allocation can be changed.

Furthermore, note that single-ended interleaved operation, within one RF cycle two clock phases are used. While in push-pull interleaved operation four phases are used.

REFERENCES

[Alavi RFIT 2011] Morteza S. Alavi, Robert B. Staszewski, Leo C. N. de Vreede; John R. Long, Orthogonal summing and power combining network in a 65-nm all-digital RF I/Q modulator, 2011 IEEE International Symposium on Radio-Frequency Integration Technology, year 2011

[Gaber, ESSCIRC 2011] W. Gaber, et al., "A CMOS IQ Direct digital RF modulator with embedded RF FIR-based quantization noise filter" ESSCIRC 2011, pp. 139-142.

[Alavi, ASSCC 2011] Morteza S. Alavi, Akshay Visweswaran, Robert B. Staszewski, Leo C. N de Vreede, John R. Long, Atef Akhnoukh, A 2-GHz digital I/Q modulator in 65-nm CMOS, IEEE Asian Solid-State Circuits Conference 2011, 2011

[Alavi, MTT 2012] Morteza Alavi, Robert Bogdan Staszewski, L. C. N. de Vreede, Akshay Vissweswaran, and John Long, "All Digital RF I/Q Modulator," IEEE MTT, vol. 60 issue 11, pp. 3513-3526, 2012.

[Lu ISSCC 2013] Chao Lu, et al. "A 24.7 dBm All-Digital RF Transmitter for Multimode Broadband Application in 40 nm CMOS", in Proc. of IEEE ISCCC, pp. 332-333, February 2013.

[Alavi RFIC 2013] Morteza S. Alavi; George Voicu; Robert B. Staszewski; Leo C. N. de Vreede; John R. Long, A 2×13-bit all-digital I/Q RF-DAC in 65-nm CMOS, 2013 IEEE Radio Frequency Integrated Circuits Symposium (RFIC), 2013

[Alavi MTT 2014] M. S. Alavi, R. G. Staszewski, L. C. N. de Vreede, J. R. Long, A Wideband 2×13-bit All-Digital I/Q RF-DAC, IEEE Transactions on Microwave Theory and Techniques, Volume: 62, Issue: 4, Part: 1, 2014, Page(s): 732-752.

[Deng ISSCC 2016] Z. Deng et al., "A dual-band digital-WiFi 802.11a/b/g/n transmitter SoC with digital I/Q combining and diamond profile mapping for compact die area and improved efficiency in 40 nm CMOS," in IEEE ISSCC Dig. Tech. Papers, February 2016, pp. 172-173.

[Jin 2015] H. Jin et al., "Efficient digital quadrature transmitter based on IQ cell sharing," in IEEE ISSCC Dig. Tech. Papers, February 2015, pp. 168-169.

[Mehrpoo RFIC 2017] M. Mehrpoo, et al., "A wideband linear direct digital RF modulator using harmonic rejection and I/Q-interleaving RF DACs", RFIC2017, pp. 188-191.

[W. Gaber TMTT 2017] W. Gaber, et al., "A 21-dBm I/Q Digital Transmitter Using Stacked Output Stage in 28-nm Bulk CMOS Technology,", TMTT 2017, pp. 4744-4757.

[Shen CICC 2020] Yiyu Shen, Rob Bootsman, Morteza S. Alavi, Leonardus de Vreede, A 0.5-3 GHz I/Q Interleaved Direct-Digital RF Modulator with up to 320 MHz Modulation Bandwidth in 40 nm CMOS, 2020 IEEE Custom Integrated Circuits Conference (CICC), 22-25 Mar. 2020

[Shen, RFIC 2020] Yiyu Shen, Rob Bootsman, Morteza S. Alavi, Leo C. N. De Vreede, A 1-3 GHz I/Q Interleaved Direct-Digital RF Modulator As A Driver for A Common-Gate PA in 40 nm CMOS, RFIC 2020-2020 IEEE Radio Frequency Integrated Circuits Symposium.

[Gaber, TMTT 2017] W. M. Gaber, et al. "A 21-dBm I/Q Digital Transmitter Using Stacked Output Stage in 28-nm Bulk CMOS Technology," TMTT, pp. 4744-4757, 2017.

[Xiong, ISSCC 2019] L. Xiong, et al., "A Broadband Switched-Transformer Digital Power Amplifier for Deep Back-Off Efficiency Enhancement," ISSCC, pp. 76-77, 2019.

[Wang, 2010] Hua Wang, Toru Matsuura, Gregoire le Grand de Mercey, San Jose, Paul Cheng-Po Liang, Koji Takinami, Richard W. D. Booth, Patent No.: U.S. Pat. No. 8,385,469 B2Date of Patent: Feb. 26, 2013, Filed Jan. 20, 2010, Assignee Panasonic Corporation (U.S. Pat. No. 8,385,469).

[Matsuura, 2011] Toru Matsuura, Wayne S. Lee, Tomoya Urushihara, Toshifumi Nakatani, Patent High Efficiency Transmitter, Pub. No.: US 2013/0058435 A1, Pub. Date: Mar. 7, 2013. Filed: Sep. 7, 2011 (US20130058435A1).

[Wentzloff et. al., 2019] U.S. Pat. No. 10,200,232 B1, Feb. 5, 2019

[Bootsman, IMS 2020] R. J. Bootsman, D. P. N. Mul, Y. Shen, R. M. Heeres, F. van Rijs, M. S. Alavi, L. C. N. de Vreede, "An 18.5 W Fully-Digital Transmitter with 60.4% Peak System Efficiency," accepted for publication at the IMS 2020 conference, June 2020.

FIG. 7A shows a top view of an embodiment of the first generation digitally controlled segmented RF power transmitter. The specific example has two banks (one indicated by D) of gate segments 3a/power output stage elements 3, e.g. implemented in LDMOS semiconductor technology. The fact that it has two banks allows it to be used both in polar operation (e.g. by operating the banks in parallel), as well as Cartesian or multi-phase operation (one bank for handling the I, A data and one bank handling the Q, B data). The configuration shown here uses per drain finger 31 only one control connection 34 that drives both the left and right gate finger 32 as such acting as one gate segment. In this example each bank features fifteen thermometer bits and seven binary weighted bits, the latter shown in more detail in FIG. 7B. The gate fingers 32 left and right of a drain finger 31 share the same driver connection 34 connected to input terminal 9a. Multiple drain fingers 31 are connected to an associated drain bond bar 33.

In the gate-segmented power output stage 2 shown in FIG. 7A, two different coding techniques are used, namely binary coding and thermometer coding. For the most significant bits (MSBs), thermometer coding is used, whereas for the least significant bits (LSBs), binary coding is used. More in particular, in the FIG. 7A embodiment, a total LDMOS gate width ($W_{gtot}$) of 41.5 mm has been segmented into two banks, each bank having fifteen thermometer-coded most significant bits (MSBs) (one indicated by A and the combination of MSBs denoted by 100) and seven binary-weighted least significant bits (LSBs) (one indicated by B and the combination of LSBs denoted by 101). In this implementation, the lowest LSBs (in the middle and denoted by 102) have been implemented twice to create some redundancy.

The power ideally outputted by one bank of gate-segmented power output stage 2 can be computed using the total sum of $Wm \times P1 + Wn \times 2^{-n} \times P1$, wherein Wm (m=1 ... 15) represents the weight factor for the mth power output stage element 3/gate element 3a that corresponds to the thermometer code, Wn (n=1 ... 7) represents the weight factor for the nth power output stage element 3/gate element 3a that corresponds to the binary code, and P1 the power outputted by a power output stage element 3/gate element 3a corresponding to the thermometer coding. The factor $2^{-n}$ describes how the gate finger width of a power output stage element 3/gate element 3a corresponding to binary coding should be chosen with respect to the gate finger width of a power output stage element 3/gate element 3a corresponding to thermometer coding. Moreover, weight factors Wm and Wn can typically either be 0, corresponding to the cut-off mode, or 1, corresponding to the on-mode.

The fifteen power output stage elements 3/gate elements 3a corresponding to the thermometer coding allow 16 different values to be generated, whereas the seven power output stage elements 3/gate elements 3a corresponding to the binary coding allow 128 different values to be generated. Hence, ideally a total of 128×16=2048 different values can be generated, which corresponds to a binary code word of 11-bit.

For the binary-weighted bits, the drain is cut in two mutually isolated parts. A first part, indicated by L1-L4, indicates the part of the drain finger that cooperates with gate fingers 32 for the purpose of generating signals. The other part, which lies in line with the first part, is connected to ground, for example using a via 103. The use of these shorted drain lines equalizes the input (gate) capacitances of all segments. Other equalization techniques like buffer scaling or use of dummy capacitance can also be considered.

For the $n^{th}$ LSB, the effective LDMOS gate width is $2^{-n}$ times that of a thermometer MSB. For example, in FIG. 7B, L4 defines the effective gate width of the gate fingers corresponding to the thermometer coding. Moreover, L4=2× L3=4×L2=8×L1.

In terms of linearity, thermometer coding is preferred as the binary coding scheme results in considerable switching events in the RF currents in view of the large amount of changes between sequential numbers. For example, changing between binary code 0111 and 1000 involves changing 4 bits. However, compared to binary coding, thermometer coding requires a large number of power output stage elements. Combining thermometer coding for the MSBs and binary coding for the LSBs can provide good results while still restricting the required number of inputs to drive the gate elements. Also hybrid methods like using two of more levels of thermometer coding are possible. These approaches are often applied in DTX. However, use of such an approach without any refinements in the actual implementation at RF frequencies and higher power levels yields large irregularities and non-monotonic behaviour in the desired transfer function (e.g. polar amplitude code word to RF transfer (CWD-RF) output signal transfer performance of the bank layout shown in FIG. 7A).

The presented invention embodiments can be applied in a variety of digital transmitters (DTX) having a segmented power output stage 121 with a plurality of unit cells 122/gate segments 3, also indicated as an (interleaved) power switch bank 121. The effect to be achieved is a Digital Transmitter (DTX) having an (interleaved) power switch bank 121 with a dynamic selection for its unit cells 121/power output stage elements 3 (or segments 3), providing a monotonic CWD-to-AM and CWD-to-PM behavior.

As shown in the example of FIG. 7A, RF power switch banks 121 can have a considerable electrical size in view of the wavelength involved. Therefore, their straightforward implementation and activation of their segments 3 will cause redistribution effects of their RF output current, yielding non-monotonic DNL or CWD-to-AM and CWD-to-PM behaviour [Bootsman, IMS 2020]. Large current redistribution can occur as a result of other situations, e.g. if in a Cartesian or multi-phase DTX implementation using two banks 121 in one RF-cycle, one bank 121 is first activated, then the other bank 121; or when using an interleaving switch bank 121-i or dynamic phase allocation of the output stage unit cells 122/segments, if these unit cells 122/segments are switched in a larger group from one phasor to another (e.g., non-monotonic activation of thermometers bits), or when binary elements are present, by applying binary switching. At present, these large current redistribution effects demand very complicated correction measures in practical DTX systems that come at the cost of higher complexity and/or power consumption. It also increases the noise floor of the output signal, well above the theoretical quantization noise for the switch bank 121 under consideration. The non-linearity not only results in large (non-monotonic) steps, but also show hard to compensate non-linear memory-effects.

One of the further possible reasons for the current redistribution effects is the physical location of an activated segment 3, which will see a different loading impedance depending on position. This is due to distributed nature (e.g. transmission line like drain fingers 31, large drain bond bar 33 or bond wire drain connections) of the switch bank 121 that starts to become electrically large for the aimed frequency range (RF). This will yield different matching conditions for different segments 3, thus impacting the overall CWD-AM and CWD-PM transfer functions. Furthermore, once one segment 3 is disabled and another segment 3 in a physically different location is activated, this current has to 'relocate', creating a dynamic disadvantageous effect on the resulting CWD-AM and CWD-PM transfer functions. This is of particular importance for non-polar systems that make use of multiple phases within an RF cycle to construct their output signal.

The present invention embodiments relates to a method of applying an activation scheme to a digitally controlled segmented RF power transmitter 2 having a plurality of adjacent segments 3, each segment 3 having an associated activation area (determining the power output contribution of that segment 3, e.g. the gate width in FET implementations, in thermometer coding and/or binary coding schemes), the segments 3 being controlled by a code word (CWD), e.g. using bits to provide an on/off control of each segment 3. The method comprises controlling segments 3 by activating a specific segment 3 using an activation scheme (e.g. using bits) for activating specific ones of the segments 3 depending on the code word CWD (e.g. on-off). The activation scheme starts from center ones of the plurality of segments 3 towards outer ones of the plurality of segments 3 for increasing code word CWD values. Note that the present invention method embodiments can be implemented in any of the digital intensive transmitter (DTX) types as described above with reference to FIG. 2, 4, 5 or 6, as either logic circuitry, software control, or a combination of both.

The present invention embodiments minimize the current redistribution (as discussed below) by maximizing the symmetry in activation of the segments 3. The controlling of the segments 3 is applied dynamically, in a further embodiment. The activation scheme is applied dynamically tracking the interpolated base band data to keep current redistribution within bounds as much as possible over time. In further embodiments, the digitally controlled segmented RF power transmitter is operated with an operation frequency $f_{RF}$, and controlling of the segments 3 is applied in synchrony with RF cycles.

To illustrate the underlying problem solved by the present invention embodiments, current redistribution in a multi-phase/poly-phase operation will now be discussed. Similar conclusions also hold for Cartesian operation. Current distribution may occurs within one RF-cycle, caused by consecutively turning on and of the different phasors (A and B), e.g. when using multiphase operation, in this example using a 25% RF duty-cycle. The plot in FIG. 8 shows an example output waveform, where A=0.25 and B=0.70. In one RF-cycle, three 'states' can be distinguished: only B, both phasors, and only A. In the following tables, each consecutive state is shown if a conventional (and the currently already implemented) two bank structure is used for the digitally controlled segmented RF power transmitter, i.e. as indicated an A-bank and a B-bank. During the RF-cycle, the current is redistributed from the right to the left.

| | A Bank | | | | B Bank | | | |
|---|---|---|---|---|---|---|---|---|
| | 3 | 2 | 1 | 0 | 0 | 1 | 2 | 3 |
| 0 | 0 | 0 | 0 | 0 | 1 | 1 | 1 | 1 |
| 1 | 0 | 0 | 0 | 0 | 1 | 1 | 1 | 1 |
| 2 | 0 | 0 | 0 | 0 | 1 | 1 | 1 | 0 |
| 3 | 0 | 0 | 0 | 0 | 0 | 0 | 0 | 0 |

| | A Bank | | | | B Bank | | | |
|---|---|---|---|---|---|---|---|---|
| | 3 | 2 | 1 | 0 | 0 | 1 | 2 | 3 |
| 0 | 1 | 1 | 1 | 1 | 1 | 1 | 1 | 1 |
| 1 | 0 | 0 | 0 | 0 | 1 | 1 | 1 | 1 |
| 2 | 0 | 0 | 0 | 0 | 1 | 1 | 1 | 0 |
| 3 | 0 | 0 | 0 | 0 | 0 | 0 | 0 | 0 |

| | A Bank | | | | B Bank | | | |
|---|---|---|---|---|---|---|---|---|
| | 3 | 2 | 1 | 0 | 0 | 1 | 2 | 3 |
| 0 | 1 | 1 | 1 | 1 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |

| | A Bank | | | | B Bank | | | |
|---|---|---|---|---|---|---|---|---|
| | 3 | 2 | 1 | 0 | 0 | 1 | 2 | 3 |
| 0 | 0 | 0 | 0 | 0 | 1 | 1 | 1 | 1 |
| 1 | 0 | 0 | 0 | 0 | 1 | 1 | 1 | 1 |
| 2 | 0 | 0 | 0 | 0 | 1 | 1 | 1 | 0 |
| 3 | 0 | 0 | 0 | 0 | 0 | 0 | 0 | 0 |

| | A Bank | | | | B Bank | | | |
|---|---|---|---|---|---|---|---|---|
| | 3 | 2 | 1 | 0 | 0 | 1 | 2 | 3 |
| 0 | 1 | 1 | 1 | 1 | 1 | 1 | 1 | 1 |
| 1 | 0 | 0 | 0 | 0 | 1 | 1 | 1 | 1 |
| 2 | 0 | 0 | 0 | 0 | 1 | 1 | 1 | 0 |
| 3 | 0 | 0 | 0 | 0 | 0 | 0 | 0 | 0 |

| | A Bank | | | | B Bank | | | |
|---|---|---|---|---|---|---|---|---|
| | 3 | 2 | 1 | 0 | 0 | 1 | 2 | 3 |
| 0 | 1 | 1 | 1 | 1 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |

In a group of embodiments according to the present invention, the code word CWD comprises two phasor code words CWD-A; CWD-B, wherein adjacent segments 3 are assigned to different phasors A, B, depending on the associated one of the two phasor code words CWD-A; CWD-B. In this way, by alternating A and B columns the 'center of gravity' of the output current waveform stays at the center part of the digitally controlled segmented RF power transmitter, yielding the most monotonic CWD-PM transfer. In other words, each segment 3 can dynamically be appointed to different phases, so there are no longer dedicated A- and B-banks (see also the interleaved DTX implementation described above). The following tables show each consecutive state with alternating A and B columns in both the left and right bank of the digitally controlled segmented RF power transmitter (see tables above), clearly showing the effect that the center of gravity of the current stays in the middle, thus providing a reduced current redistribution, and minimizes the location dependent loading differences between the A and B cells.

| | A | B | A | B | A | B | A | B |
|---|---|---|---|---|---|---|---|---|
| | 3 | 2 | 1 | 0 | 0 | 1 | 2 | 3 |
| 0 | 0 | 1 | 0 | 1 | 0 | 1 | 0 | 1 |
| 1 | 0 | 1 | 0 | 1 | 0 | 1 | 0 | 1 |
| 2 | 0 | 1 | 0 | 1 | 0 | 1 | 0 | 0 |
| 3 | 0 | 0 | 0 | 0 | 0 | 0 | 0 | 0 |

| | A | B | A | B | A | B | A | B |
|---|---|---|---|---|---|---|---|---|
| | 3 | 2 | 1 | 0 | 0 | 1 | 2 | 3 |
| 0 | 1 | 1 | 1 | 1 | 1 | 1 | 1 | 1 |
| 1 | 0 | 1 | 0 | 1 | 0 | 1 | 0 | 1 |
| 2 | 0 | 1 | 0 | 1 | 0 | 1 | 0 | 0 |
| 3 | 0 | 0 | 0 | 0 | 0 | 0 | 0 | 0 |

|   | A | B | A | B | A | B | A | B |
|---|---|---|---|---|---|---|---|---|
|   | 3 | 2 | 1 | 0 | 0 | 1 | 2 | 3 |
| 0 | 1 | 0 | 1 | 0 | 1 | 0 | 1 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |

In a further group of embodiments, if values of the two phasor code words CWD-A; CWD-B are unequal, and sufficient segments 3 have been activated to reach the lowest value of the two phasor code words, further adjacent available segments 3 are assigned to the phasor A; B associated with other one of the two phasor code words CWD-A; CWD-B. This will even further minimize current distribution (also over y-axis in the above examples), and still keep the current distribution symmetric. Furthermore, the current density is distributed more evenly over the drain fingers.

It is noted that in the above examples, and the examples discussed below, the plurality of adjacent segments 3 comprises an array of segments 3($i,j$), the array having n rows and m columns. Thus, the digitally controlled segmented RF power transmitter can be implemented as a rectangular area with the various segments 3 oriented in an array pattern.

It is now possible to also minimize the current redistribution in the x-axis (of the tables above). After alternating A and B columns as explained with reference to the previous group of embodiment, it is possible to fill all further segments 3 with either A or B. An activation example is shown in below table. A cells represent A (in this example fifty activated segments 3), and B cells represent B (in this example twenty activated segments 3). In this example A>B, and thus after alternating A and B, the final part is filled with A. This approach minimizes the current redistribution at the y-axis. Moreover, minimizes the distances between the different activated unit cells of when A is activated.

tion keeping the losses low (note the specific order of columns C<0> ... C<15>). Alternating the A and B columns minimizes the current redistribution between A and B phasors. After alternating, all segments 3 are filled from the top with the remaining phasor (in consecutive rows R<0> ... R<7>), resulting in a minimized current redistribution over the y-axis as well as the lowest losses over the drain finger. This keeps the 'center of gravity' of the output waves in the center of the segmented output stage (switch bank 121) at all times (also within one RF cycle), and the total area with activated segments 3 is as compact as possible to minimize the distance between two activated segments 3. Note that after alternating A and B, the final part is filled with A or with B, when A>B or B>A, respectively, minimizing the total area of activated segments 3.

For an actual implementation, two or more bits are required for correct activation of a segment 3, which are to be derived from the code word CWD. An activation bit can be applied to indicate whether or not a segment 3 is to be activated, and a phasor bit can be applied and includes information which phasor is selected for the activation, i.e. activation at the A or the B phasor.

As a first step, an activation order is provided which would result in a symmetric activation of the segments 3. In the below table, an exemplary activation ordering is shown for an array of segments 3 having eight columns C<i> and eight rows R<j>:

|      | Columns |    |    |   |   |   |   |   |   |   |   |   |   |    |    |    |
|------|---------|----|----|---|---|---|---|---|---|---|---|---|---|----|----|----|
| Rows | 14      | 13 | 10 | 9 | 6 | 5 | 2 | 1 | 0 | 3 | 4 | 7 | 8 | 11 | 12 | 15 |
| 0    | A       | B  | A  | B | A | B | A | B | A | B | A | B | A | B  | A  | B  |
| 1    | A       | B  | A  | B | A | B | A | B | A | B | A | B | A | B  | A  | B  |
| 2    | A       | A  | A  | A | A | B | A | B | A | B | A | B | A | A  | A  | A  |
| 3    | A       | A  | A  | A | A | A | A | A | A | A | A | A | A | A  | A  | A  |
| 4    | —       | —  | —  | — | — | A | A | A | A | A | A | — | — | —  | —  | —  |
| 5    | —       | —  | —  | — | — | — | — | — | — | — | — | — | — | —  | —  | —  |
| 6    | —       | —  | —  | — | — | — | — | — | — | — | — | — | — | —  | —  | —  |
| 7    | —       | —  | —  | — | — | — | — | — | — | — | — | — | — | —  | —  | —  |

Using this activation scheme embodiment, the activation from the middle to the sides provides the most even possible current distribution over the width of the device while concentrating the activation the closed to the drain connec-

|      | Columns |      |      |      |      |      |      |      |
|------|---------|------|------|------|------|------|------|------|
| Rows | C(6)    | C(5) | C(2) | C(1) | C(0) | C(3) | C(4) | C(7) |
| R(0) | 7       | 6    | 3    | 2    | 1    | 4    | 5    | 8    |
| R(1) | 15      | 14   | 11   | 10   | 9    | 12   | 13   | 16   |
| R(2) | 23      | 22   | 19   | 18   | 17   | 20   | 21   | 24   |
| R(3) | 31      | 30   | 27   | 26   | 25   | 28   | 29   | 32   |
| R(4) | 39      | 38   | 35   | 34   | 33   | 36   | 37   | 40   |
| R(5) | 47      | 46   | 43   | 42   | 41   | 44   | 45   | 48   |
| R(6) | 55      | 54   | 51   | 50   | 49   | 52   | 53   | 56   |
| R(7) | 63      | 62   | 59   | 58   | 57   | 60   | 61   | 64   |

Row-column encoding and decoding is used to the activation bits for each segment 3. Note that in the table above, the connection order of each column C<i> is adapted to obtain a filling from the middle to sides, rather than from left to right or in a snake wise activation scheme [Alavi, MTT 2014]. Thus, in the left bank of the digitally controlled segmented RF power transmitter the order of columns is C<6>; C<5>; C<2>; C<1>, and in the right bank C<0>; C<3>; C<4>; C<7>. The associated decoder logic, implemented in each segment 3, is shown in the schematic view of FIG. 9, showing a decoder circuit 20 comprising an AND gate 21, OR gate 22, and an optional flip-flop gate 23 receiving a clock signal 24 as input.

In an embodiment of the present invention, using the decoder logic shown in FIG. 4, activation of a specific segment 3(i, j) in row i and column j of the array is obtained using a decoder, which implements the logic formula: (R<i> AND C<j>) OR Row<i+1>.

For a code word CWD (CWD-A=50 and CWD-B=20) having a total value (A+B or I+Q) of 70, the following table then shows the activation of the respective segments 3, for an example having two banks of segments 3, each having eight columns C and eight rows R:

Note that the even columns C<0>; C<2>; C<4>; C<6>; C<8>; C<10>; C<12>; C<14> start as A phasor and the odd columns C<1>; C<3>; C<5>; C<7>; C<9>; C<11>; C<13>; C<15> start as B phasor. Initially these are indicated as A-columns and B-columns, respectively, although, as shown above, both can switch to the other phasor. A phasor selector bit is introduced to know when the segment 3 should switch to the other phasor. This phasor selector bit needs to indicate when the phasor of a segment 3 needs to switch from the initial phasor (based on whether the segment is in an A-column or in a B-column) to the other phasor. In the example above, the phasor selector bit needs to switch in the B'-columns, when twenty segments 3 are activated with the phasor of B.

FIG. 14 shows a schematic diagram of a switch bank 121 of a DTX according to an embodiment of the present invention, having a drain bond bar 33 connecting a plurality of drain fingers 31, and a plurality of gate contact pads 32. The gate contact pads 32 are assigned to the respective rows R(1) . . . R(n) and columns C(0) . . . C(15) as discussed above, allowing to implement the present invention method embodiments.

| Rows | Columns C(.) | | | | | | | | | | | | | | | |
|---|---|---|---|---|---|---|---|---|---|---|---|---|---|---|---|---|
| | ⟨14⟩ | ⟨13⟩ | ⟨10⟩ | ⟨9⟩ | ⟨6⟩ | ⟨5⟩ | ⟨2⟩ | ⟨1⟩ | ⟨0⟩ | ⟨3⟩ | ⟨4⟩ | ⟨7⟩ | ⟨8⟩ | ⟨11⟩ | ⟨12⟩ | ⟨15⟩ |
| R⟨0⟩ | 1 | 1 | 1 | 1 | 1 | 1 | 1 | 1 | 1 | 1 | 1 | 1 | 1 | 1 | 1 | 1 |
| R⟨1⟩ | 1 | 1 | 1 | 1 | 1 | 1 | 1 | 1 | 1 | 1 | 1 | 1 | 1 | 1 | 1 | 1 |
| R⟨2⟩ | 1 | 1 | 1 | 1 | 1 | 1 | 1 | 1 | 1 | 1 | 1 | 1 | 1 | 1 | 1 | 1 |
| R⟨3⟩ | 1 | 1 | 1 | 1 | 1 | 1 | 1 | 1 | 1 | 1 | 1 | 1 | 1 | 1 | 1 | 1 |
| R⟨4⟩ | — | — | — | — | — | 1 | 1 | 1 | 1 | 1 | 1 | — | — | — | — | — |
| R⟨5⟩ | — | — | — | — | — | — | — | — | — | — | — | — | — | — | — | — |
| R⟨6⟩ | — | — | — | — | — | — | — | — | — | — | — | — | — | — | — | — |
| R⟨7⟩ | — | — | — | — | — | — | — | — | — | — | — | — | — | — | — | — |

The phasor selection is then applied, wherein the activation scheme further comprises applying a phasor selector $C_A$, $R_A$; $C_B$, $R_B$ for selecting a first phasor A or a second phasor B when activating the segment 3, the phasor selector $C_A$, $R_A$; $C_B$, $R_B$ having a high value '1' (or selection value) as long as the number of activated A or B segments 3 is less than or equal to the value of the associated code word CWD-A; CWD-B and a low value '0' (or non-selection value) when the number of activated segments 3 is higher than the value of the associated code word CWD-A; CWD-B. Note that the selection and non-selection values can also be inverted logic values.

Initially, the total number of activated segments 3 is known (from code word CWD, or sum of code words CWD-A and CWD-B), not whether a segment will be activated at the A or the B phasor. As indicated above, the following table shows the desired final output:

In this group of embodiments, the value of code word CWD-A is sent to the A-columns and the value of CWD-B to the B-columns for proper and desired activation, further explained using the following steps.

For the phase selector bit, the columns C are arranged (A-columns and B-columns are split, indicated by the respective indexes in the columns), as shown in the below table. The two values of CWD-A and CWD-B are sent to the corresponding columns, again using row-column decoders. The phasor selector now switches from 1 to 0 when enough segments of the relevant phasor are activated. The table below shows the column arrangement and numbering in the 2 top rows. The output of the phase selector is shown for CWD-A=50 and CWD-B=20. Note that in this example only the B phasor selector affects the final activation. The A phasor selector switches only non-activated segments 3 (border of activated segments is indicated in the table by the black line). Output of the phasor activators (note that all segments above black line are activated by activation bit):

| Rows | Columns C(.) | | | | | | | | | | | | | | | |
|---|---|---|---|---|---|---|---|---|---|---|---|---|---|---|---|---|
| | ⟨14⟩ | ⟨13⟩ | ⟨10⟩ | ⟨9⟩ | ⟨6⟩ | ⟨5⟩ | ⟨2⟩ | ⟨1⟩ | ⟨0⟩ | ⟨3⟩ | ⟨4⟩ | ⟨7⟩ | ⟨8⟩ | ⟨11⟩ | ⟨12⟩ | ⟨15⟩ |
| R⟨0⟩ | A | B | A | B | A | B | A | B | A | B | A | B | A | B | A | B |
| R⟨1⟩ | A | B | A | B | A | B | A | B | A | B | A | B | A | B | A | B |
| R⟨2⟩ | A | A | A | A | A | B | A | B | A | B | A | B | A | A | A | A |
| R⟨3⟩ | A | A | A | A | A | A | A | A | A | A | A | A | A | A | A | A |
| R⟨4⟩ | — | — | — | — | — | A | A | A | A | A | A | — | — | — | — | — |
| R⟨5⟩ | — | — | — | — | — | — | — | — | — | — | — | — | — | — | — | — |
| R⟨6⟩ | — | — | — | — | — | — | — | — | — | — | — | — | — | — | — | — |
| R⟨7⟩ | — | — | — | — | — | — | — | — | — | — | — | — | — | — | — | — |

| | $C_A$(7) | $C_B$(6) | $C_A$(5) | $C_B$(4) | $C_A$(3) | $C_B$(2) | $C_A$(1) | $C_B$(0) | $C_A$(0) | $C_B$(1) | $C_A$(2) | $C_B$(3) | $C_A$(4) | $C_B$(5) | $C_A$(6) | $C_B$(7) | | |
|---|---|---|---|---|---|---|---|---|---|---|---|---|---|---|---|---|---|---|
| $R_A$(0) 1 | | | | | 1 | 1 | 1 | 1 | 1 | 1 | 1 | 1 | 1 | 1 | 1 | 1 | 1 | $R_B$(0) |
| $R_A$(1) 1 | | | | | | | | | | | | | | | | | 1 | $R_B$(1) |
| $R_A$(2) 1 | | | | | 1 | 1 | 1 | 1 | 1 | 1 | 1 | 1 | 1 | 1 | 1 | 1 | 1 | $R_B$(2) |
| $R_A$(3) 1 | | | | | | | | | | | | | | | | | 0 | $R_B$(3) |
| $R_A$(4) 1 | | | | | 1 | 0 | 1 | 0 | 1 | 1 | 1 | 1 | 1 | 1 | 1 | 0 | 0 | $R_B$(4) |
| $R_A$(5) 1 | | | | | | | | | | | | | | | | | 0 | $R_B$(5) |
| $R_A$(6) 1 | | | | | 1 | 0 | 1 | 0 | 1 | 0 | 1 | 0 | 1 | 0 | 1 | 0 | 0 | $R_B$(6) |
| $R_A$(7) 0 | | | | | | | | | | | | | | | | | 0 | $R_B$(7) |
| | | | | | 1 | 0 | 1 | 0 | 1 | 0 | 1 | 0 | 1 | 0 | 1 | 0 | | |
| | | | | | 1 | 0 | 1 | 0 | 1 | 0 | 1 | 0 | 1 | 0 | 1 | 0 | | |
| | | | | | 0 | 0 | 0 | 0 | 0 | 1 | 0 | 1 | 0 | 0 | 0 | 0 | | |
| | | | | | 0 | 0 | 0 | 0 | 0 | 0 | 0 | 0 | 0 | 0 | 0 | 0 | | |

The final activation after combining activation bit with phasor selection then provides the following table:

| | $C_A$(7) | $C_B$(6) | $C_A$(5) | $C_B$(4) | $C_A$(3) | $C_B$(2) | $C_A$(1) | $C_B$(0) | $C_A$(0) | $C_B$(1) | $C_A$(2) | $C_B$(3) | $C_A$(4) | $C_B$(5) | $C_A$(6) | $C_B$(7) | | |
|---|---|---|---|---|---|---|---|---|---|---|---|---|---|---|---|---|---|---|
| $R_A$(0) 1 | | | | | A | B | A | B | A | B | A | B | A | B | A | B | 1 | $R_B$(0) |
| $R_A$(1) 1 | | | | | | | | | | | | | | | | | 1 | $R_B$(1) |
| $R_A$(2) 1 | | | | | A | B | A | B | A | B | A | B | A | B | A | B | 1 | $R_B$(2) |
| $R_A$(3) 1 | | | | | | | | | | | | | | | | | 0 | $R_B$(3) |
| $R_A$(4) 1 | | | | | A | A | A | A | A | B | A | B | A | B | A | A | 0 | $R_B$(4) |
| $R_A$(5) 1 | | | | | | | | | | | | | | | | | 0 | $R_B$(5) |
| $R_A$(6) 1 | | | | | A | A | A | A | A | A | A | A | A | A | A | A | 0 | $R_B$(6) |
| $R_A$(7) 0 | | | | | | | | | | | | | | | | | 0 | $R_B$(7) |
| | – | – | – | – | – | A | A | A | A | A | – | – | – | – | – | | | |
| | – | – | – | – | – | – | – | – | – | – | – | – | – | – | – | – | | |
| | – | – | – | – | – | – | – | – | – | – | – | – | – | – | – | – | | |
| | – | – | – | – | – | – | – | – | – | – | – | – | – | – | – | – | | |

In the first two rows R<0> and R<1>, both the A and B phasor activators are '1', and A and B phasors are alternating for all columns C. Once 20 segments 3 in the B-columns are activated with the B phasor, the B-columns switch to the A phasor. Note that the maximum value of one of the phasors (CWD-A; CWD-B) is equal to the total number of segments, however, the maximum value which can be used in the phasor selection is half of the number of segments. When CWD-A or CWD-B is more than half of the total number of segments, the phasor selection needs to contain selective values for all segments (i.e. in all segments of the columns initially appointed to the associated CWD (A or B) should remain activated at the initial phase).

This method embodiment can e.g. be implemented using one row-column decoder for the activation and two row-column decoders are used for the phasor selection (each with half the number of the columns). Each segment 3 is then connected to only one of the two row-column decoders, in accordance with which column the segment 3 is assigned to. In an example with a total of four rows and eight columns, this would result in the following resulting steps:

| | C(6) | C(5) | C(2) | C(1) | C(0) | C(3) | C(4) | C(7) |
|---|---|---|---|---|---|---|---|---|
| | 0 | 0 | 1 | 1 | 1 | 1 | 0 | 0 |
| R(0) 1 | | | 1 | 1 | 1 | 1 | 1 | 1 |
| R(1) 1 | | | | | | | | |
| R(2) 1 | | | 1 | 1 | 1 | 1 | 1 | 1 |
| R(3) 0 | | | | | | | | |
| | 0 | 0 | 1 | 1 | 1 | 1 | 0 | 0 |
| | 0 | 0 | 0 | 0 | 0 | 0 | 0 | 0 |

|  | Input | $C_A\langle 3\rangle$ 0 | $C_B\langle 2\rangle$ 1 | $C_A\langle 1\rangle$ 0 | $C_B\langle 0\rangle$ 1 | $C_A\langle 0\rangle$ 1 | $C_B\langle 1\rangle$ 1 | $C_A\langle 2\rangle$ 0 | $C_B\langle 3\rangle$ 0 | Input |  |
|---|---|---|---|---|---|---|---|---|---|---|---|
| $R_A\langle 0\rangle$ | 1 |  |  | 1 | 1 | 1 | 1 | 1 | 1 |  | $R_B\langle 0\rangle$ |
| $R_A\langle 1\rangle$ | 1 |  |  |  |  |  |  |  |  |  | $R_B\langle 1\rangle$ |
| $R_A\langle 2\rangle$ | 1 |  |  |  |  |  |  |  |  |  | $R_B\langle 2\rangle$ |
| $R_A\langle 3\rangle$ | 1 |  |  | 1 | 1 | 1 | 1 | 1 | 0 |  | $R_B\langle 3\rangle$ |
|  |  |  |  | 1 | 0 | 1 | 0 | 1 | 0 |  |  |
|  |  |  |  | 0 | 0 | 0 | 0 | 1 | 0 | 0 | 0 |

|  |  | $C_A\langle 6\rangle$ $C_A\langle 3\rangle$ | $C_B\langle 5\rangle$ $C_B\langle 2\rangle$ | $C_A\langle 2\rangle$ $C_A\langle 1\rangle$ | $C_B\langle 1\rangle$ $C_B\langle 0\rangle$ | $C_A\langle 0\rangle$ $C_A\langle 0\rangle$ | $C_B\langle 3\rangle$ $C_B\langle 1\rangle$ | $C_A\langle 4\rangle$ $C_A\langle 2\rangle$ | $C_B\langle 7\rangle$ $C_B\langle 3\rangle$ | S |  |
|---|---|---|---|---|---|---|---|---|---|---|---|
| R(0) | $R_A\langle 0\rangle$ |  |  | A | B | A | B | A | B |  | $R_B\langle 0\rangle$ |
| R(1) | $R_A\langle 1\rangle$ |  |  |  |  |  |  |  |  |  | $R_B\langle 1\rangle$ |
| R(2) | $R_A\langle 2\rangle$ |  |  | A | B | A | B | A | A |  | $R_B\langle 2\rangle$ |
| R(3) | $R_A\langle 3\rangle$ |  |  |  |  |  |  |  |  |  | $R_B\langle 3\rangle$ |
|  |  |  |  | A | A | A | A |  |  |  |  |

FIG. 15 shows a schematic diagram of a switch bank of a DTX according to a further embodiment of the present invention, allowing to implement this embodiment. The structure is similar to the structure shown in FIG. 14, however, the gate pads 32 are now assigned to the rows $R_A\langle i\rangle$, $R_B\langle i\rangle$ and columns $C_A\langle j\rangle$, $C_B\langle j\rangle$.

It is noted that these embodiments can also be applied in push-pull embodiments of the DTX variants as discussed above, as shown in the schematic diagrams of FIGS. 16 and 17. In the switch bank 121 implementations, this means that adjacent drain fingers 31 are alternately assigned as push drain finger (diagonal hatching) or pull drain finger (horizontal hatching). The push drain fingers are interconnected in a push drain (bond) bar (not shown) and the pull drain fingers are interconnected in a pull drain (bond) bar (not shown). In more general wording, in a further embodiment the plurality of adjacent segments 3 comprise interleaved drain fingers in a push-pull configuration of the digitally controlled segmented RF power transmitter. Note that in the case of a push-pull configuration, one can use a single unit cell to control both push and pull gate segments, or make use of two separate unit cells to control the push and pull fingers independently.

In a further group of embodiments, selecting a first phasor A or a second phasor B for a specific segment 3(i, j) in row i and column j of the array is obtained using a second decoder, which implements the logic formula: ($R_A\langle i\rangle$ AND $C_A\langle j\rangle$) OR $R_A\langle i+1\rangle$, and ($R_B\langle i\rangle$ AND $C_B\langle j\rangle$) OR $R_B\langle i+1\rangle$, respectively. This is e.g. implemented using the decoder circuitry as shown in the exemplary embodiment of FIG. 10. A second decoder circuit 40 is provided, which includes the decoder circuit 20 as shown in the FIG. 9 embodiment now using R<x>, R<x+1> and C<y> as inputs. The second decoder circuit 40 further comprises a second AND gate 41 (with $R_A\langle i\rangle$ and $C_A\langle j\rangle$ as input), second OR gate 42 (with the output of second AND gate 41 and $R_A\langle i+1\rangle$ as inputs), second flip-flop gate 43 (using the same clock signal 24 as the first decoder circuit), a multiplexer 44 for selecting either the first phasor A or the second phasor B, depending on the output of second flip-flop gate 43), and an output AND gate 45 combining the outputs from the first and second decoder circuits 20, 40. The first decoder circuit 20 controls the activation, the second decoder circuit 40 controls the phasor selection.

FIG. 11 shows a schematic diagram of the array of second decoder circuits 40 used to control the array of segments 3, which are arranged in respective A- and B-columns. For each segment 3, the indicated parameters R<x>, C<y> are used for activation, and the parameters $R_A\langle i\rangle$, $C_A\langle j\rangle$, $R_B\langle i\rangle$, $C_B\langle j\rangle$ are used for phasor selection.

In a further group of embodiments, selecting a first phasor A or a second phasor B for a specific segment 3(i, j) in row i and column j of the array is obtained using a second decoder, which implements the logic formula: (($R_{phasor}\langle x\rangle$ AND $C_{phasor}\langle y_{phasor}\rangle$) OR $R_{phasor}\langle x+1\rangle$) OR PhSel, PhSel being an added bit indicating which of the associated code words (CWD-A; CWD-B) is the highest. This is e.g. implemented using the decoder circuitry as shown in the exemplary embodiment of FIG. 12. A third decoder circuit 50 is provided, which includes the decoder circuit 20 as shown in the FIG. 9 embodiment, but now using R<x>, R<x+1> and C<y> as inputs. The third decoder circuit 50 further comprises a third AND gate 51 (with $R_{phasor}\langle x\rangle$ and $C_{phasor}\langle y_{phasor}\rangle$ as input), third OR gate 42 (with the output of third AND gate 51 and $R_{phasor}\langle x+1\rangle$ as inputs), third flip-flop gate 53 (using the same clock signal 24 as the first decoder circuit 20), and an additional OR gate 56, receiving the output of (optional) third flip-flop gate 53 and the PhSel signal as inputs. A multiplexer 54 is provided for selecting either the first phasor A or the second phasor B, depending on the output of the additional OR gate 56. An output AND gate 55 combines the outputs from the first and third decoder circuits 20, 50. The first decoder circuit 20 controls the activation, the third decoder circuit 50 controls the phasor selection.

FIG. 13 shows a schematic diagram of the array of third decoder circuits 50 used to control the array of segments 3, which are arranged in respective A- and B-columns. For each segment 3, the indicated parameters R<x>, C<y> are used for activation, and the parameters $R_{phasor}\langle x\rangle$, $C_{phasor}\langle y_{phasor}\rangle$, and PhSel are used for phasor selection. This embodiment thus uses only one row-column detector parameter for the phasor selection, connected to both the A-columns and the B-columns, as shown in FIG. 13. As mentioned above, a separate bit is added (PhSel) to decide whether the A-columns or the B-columns are sensitive to the phasor selector. The output of the Phasor row-column detector and the PhSel-bit combined using the additional OR-gate 56, result in the phasor selection bit. Based on this bit, either the A column will change to activation at the B phasor, or the B column changes to activation at the A phasor.

It is noted that the column input of the third decoder circuit 50 is in this case shared between the A and the neighboring B column. Whether or not the decoder changes the input of the multiplexer 54 depends on the PhSel bit. For this reason the additional OR-gate 56 is added compared to the embodiments shown in FIG. 10. The advantage is that only one row-column detector is required to implement phasor selection. As a result there is one control line less running through all the rows (and one line extra running through all columns). It is noted that the PhSel bit has information of which code word CWD-A or CWD-B has a larger value. In some implementations this information is readily available, in further exemplary implementations this comparison need to be added in the logic circuitry. Also it is noted that for each segment 3, the third decoder circuit 50 has one extra input, compared to the second decoder circuit 40.

The above described embodiments all relate to digitally controlled segmented RF power transmitters having thermometer bits having a smaller drain current contribution), close to or at the center of the switch bank. Examples are described in the paragraphs below.

Using binary bits for binary coding of output power contribution may also have influence regarding current (re)distribution. A (fully) binary implementation yields large current redistribution when large bits switch are turned on or off, as shown in FIG. 19.

Limiting the number of binary bits would reduce this problem, however, a few additional binary bits can add a lot of resolution with very few extra connections, which can be very advantageous. In any case, further embodiments are envisioned as described below, which further decrease or mitigate possible current redistribution effects when using binary bits. Even with a few binary bits non-monotonic behavior can occur in a digitally controlled segmented RF power transmitter, as the contribution to the output wave depends on the location of the specific activated segment. A desire is to have the binary controlled segments 3 as close as possible to the latest thermometer style activated segment 3. Note that even adding only one set of binary segments 3 per phasor A, B, the location of the binary bit can be far away from the switching thermometer bits, as shown in below table:

| | | | | | | | | Columns C ( . ) | | | | | | | | |
|---|---|---|---|---|---|---|---|---|---|---|---|---|---|---|---|---|
| | (14) | (13) | (10) | (9) | (6) | (5) | (2) | (1) | (0) | (3) | (4) | (7) | (8) | (11) | (12) | (15) |
| Binary | | | | | | | | B | A | | | | | | | |
| R(0) R(1) | | | | | A | B | A | B | A | B | A | B | A | B | A | B |
| R(2) R(3) | | | | | A | B | A | B | A | B | A | B | A | B | A | B |
| R(4) R(5) | | | | | A | A | A | A | B | A | B | A | B | A | A | A |
| R(6) R(7) | | | | | A | A | A | A | A | A | A | A | A | A | A | A |
| | – | – | – | – | – | A | A | A | A | A | A | – | – | – | – | – |
| | – | – | – | – | – | – | – | – | – | – | – | – | – | – | – | – |
| | – | – | – | – | – | – | – | – | – | – | – | – | – | – | – | – |
| | – | – | – | – | – | – | – | – | – | – | – | – | – | – | – | – | mometer type of control of the associated segments 3. I.e. the activation area of a predetermined group of the plurality of segments 3 is equal. If the predetermined group comprises all segments 3, a single level thermometer coding is available, however, also multi-level thermometer coding can be applied. In a further group of embodiments, the activation areas of a first subset of the plurality of adjacent segments 3 are equal and provide a thermometer coding of the output power contribution, and the activation areas of adjacent ones of a second subset of the plurality of adjacent segments 3 are providing an additional binary coding of the output power contribution. Note that again, the thermometer coding applied can be single level or multi-level. Where it is beneficial to implement the smaller thermometer bits (e.g.

In a further embodiment using binary bits, the first subset of the plurality of adjacent segments 3 comprises an array of segments 3(i,j), the array having n rows and m columns, further comprising m sets of the second subset of the plurality of adjacent segments (3), which are provided as a top row positioned adjacent to the n rows. This allows to always have one set of the second subset to be near to the latest activated thermometer style segment 3. In even further embodiments, for each phasor A, B one of the m sets of the second subset is activated, corresponding to the highest column number activated in the first subset of the plurality of adjacent segments 3.

These embodiments can be explained using the following table:

|  | Columns C⟨.⟩ | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
|  | ⟨14⟩ | | ⟨13⟩ | | ⟨10⟩ | | ⟨9⟩ | | ⟨6⟩ | | ⟨5⟩ | | ⟨2⟩ | | ⟨1⟩ | | ⟨0⟩ | | ⟨3⟩ | | ⟨4⟩ | | ⟨7⟩ | | ⟨8⟩ | | ⟨11⟩ | | ⟨12⟩ | | ⟨15⟩ | |
| Binary | B | A | B | A | B | A | B | A | B | A | B | A | B | A | B | A | B | A | B | A | B | A | B | A | B | A | B | A | B | A | B | A |
| R⟨0⟩ |  |  |  |  |  |  |  |  |  |  |  | A | B | A | B | A | B | A | B | A | B |  |  |  |  |  |  |  |  |  |  |  |
| R⟨1⟩ |  |  |  |  |  |  |  |  |  |  |  | A | B | A | B | A | B | A | B | A | B |  |  |  |  |  |  |  |  |  |  |  |
| R⟨2⟩ |  |  |  |  |  |  |  |  |  |  |  | A | A | A | B | A | B | A | B | A | A |  |  |  |  |  |  |  |  |  |  |  |
| R⟨3⟩ |  |  |  |  |  |  |  |  |  |  |  | A | A | A | A | A | A | A | A | A | A |  |  |  |  |  |  |  |  |  |  |  |
| R⟨4⟩ |  |  |  |  |  |  |  |  |  |  |  | A | A | A | A | A | A | A |   |   |   |  |  |  |  |  |  |  |  |  |  |  |
| R⟨5⟩ |  |  |  |  |  |  |  |  |  |  |  |   |   |   | – | – | – | – |   |   |   |  |  |  |  |  |  |  |  |  |  |  |
| R⟨6⟩ |  |  |  |  |  |  |  |  |  |  |  |   |   |   | – | – | – | – |   |   |   |  |  |  |  |  |  |  |  |  |  |  |
| R⟨7⟩ |  |  |  |  |  |  |  |  |  |  |  |   |   |   | – | – | – | – |   |   |   |  |  |  |  |  |  |  |  |  |  |  |

In is example, a few binary controlled segments 3 are added which can be close to activated thermometer style segments 3, by adding multiple sets of binary controlled segments 3 at an additional top row (indicated as 'Binary'). By duplicating the set of binary bits at the top of each column, it is possible to dynamically select which specific set of binary controlled segment 3 is to be used, e.g. by choosing the set closest to the next to be activated thermometer segment 3. In the above example, the activated binary segments are hatched similar to the activated thermometer style segments.

In an alternative set of embodiments, the first subset of the plurality of adjacent segments 3 comprises an array of segments $3(i,j)$, the array having n rows and m columns, further comprising up to n sets of the second subset of the plurality of adjacent segments 3, which are provided here as a middle column in the array. This allows to add a few binary controlled segments close to the thermometer style activated segments, by adding multiple sets of binary controlled segments as an additional column in the middle of the array.

Furthermore, for each phasor A, B one of the n sets of the second subset is activated, corresponding to the highest row number activated in the first subset of the plurality of adjacent segments 3. This allows to dynamically choose which set of binary segment are used, choose the set closest to the highest activated thermometer segment.

These embodiments can be explained using the following table, with the added columns labeled 'Binary':

symmetry axis of the gate segmented switch bank) are preferably used to implement the smaller thermometer bits. An example of such an embodiment for a push-pull switch bank implementation using two levels of thermometer bits is given, with the smaller $2^{nd}$ level smaller thermometer centered around the symmetry axis is in FIG. 18. The drain fingers are shared by gate segments on both sides of the drain finger. The alternating push-pull drain finger organization allows now also the use of push pull driver/unit cells, with the exception of the outside the outer drain fingers, that are not used in this example (Not Connected). Note that by using such an even number of alternating push pull fingers in combination with a push-pull (double) drain bar at the top that is cross-connected in the middle of the switch bank (not shown), a fully symmetric push pull switch bank can be realized that allows truly symmetric activation of its segments, while offering high resolution due to the two levels thermometer segment implementation. As such, this embodiment will support a very smooth, as well as, monotonic CWD to RF signal transfer, which allows an easier, as well as, more effective correction by a digital pre-distorter arrangement than conventional DTX switch bank implementation schemes with their related activation.

In all above described exemplary embodiments, the activation scheme activates the plurality of adjacent segments 3 row-by-row. In an implementation of an array type of digitally controlled segmented RF power transmitter wherein the top row is positioned close to a drain bar, this

| | | | | | | | | Columns C ( . ) | | | | | | | | |
|---|---|---|---|---|---|---|---|---|---|---|---|---|---|---|---|---|
| | ( 14 ) | ( 13 ) | ( 10 ) | ( 9 ) | ( 6 ) | ( 5 ) | ( 2 ) | ( 1 ) | Bin/ $th^{2nd}$ | ( 0 ) | ( 3 ) | ( 4 ) | ( 7 ) | ( 8 ) | ( 11 ) | ( 12 ) | ( 15 ) |
| R ( 0 ) | | | | | | | | | $A \mid B$ | | | | | | | | |
| R ( 1 ) | | | | A | B | A | B | A B A B | $A \mid B$ | A B A B A B A B | | | | | | | |
| R ( 2 ) | | | | | | | | | $A \mid B$ | | | | | | | | |
| R ( 3 ) | | | | A | B | A | B | A B A B | $A \mid B$ | A B A B A B A B | | | | | | | |
| R ( 4 ) | | | | | | | | | $A \mid B$ | | | | | | | | |
| R ( 5 ) | | | | A | A | A | A | A B A B | $A \mid B$ | A B A B A A A A | | | | | | | |
| R ( 6 ) | | | | | | | | | $A \mid B$ | | | | | | | | |
| R ( 7 ) | | | | A | A | A | A | A A A A | $A \mid B$ | A A A A A A A A | | | | | | | |
| | – | – | – | – | – | A | A | A | $A \mid B$ | A A A | – | – | – | – | | | |
| | – | – | – | – | – | – | – | – | $A \mid B$ | – | – | – | – | – | – | – | – |
| | – | – | – | – | – | – | – | – | $A \mid B$ | – | – | – | – | – | – | – | – |
| | – | – | – | – | – | – | – | – | $A \mid B$ | – | – | – | – | – | – | – | – |

In the foregoing embodiments combinations of the use of thermometer bits complemented with binary bits have been discussed. Alternatively two (or even more) levels of thermometer bits can be used, e.g. the above described $2^7$ (128) thermometer bits switch bank was using binary bits in its center columns to increase its effective resolution. However, these binary bits could also be replaced by a $2^{nd}$ level of $2^n$ thermometer bits, which each are sized a factor $2^n$ smaller in their contribution to the output current, than the thermometer bits used to implement the first level. Note that such a concept is more straightforward to implement, while still be able to give a significant improvement of the resolution of the switch bank. Although various flavors are possible, also here, a symmetric activation of these smaller thermometer bits is beneficial in achieving a higher resolution with smooth CWD to RF transfer. Note that when considering a push-pull version, the inner drain fingers (close to the will result in the activation of segments 3 starting with the row nearest to the drain bar, allowing a symmetric current distribution with as little as possible current distribution effects.

In a further group of embodiments, the activation scheme activates the plurality of adjacent segments 3 column-by-column. In many implementations of a digitally controlled segmented RF power transmitter with a drain bar 33 connected to all segments 3, drain fingers 31 are used extending from the drain bar 33 to reach all active areas of all segments 3. By using this group of embodiments, the total area with activated segments 3 can be kept as compact as possible to minimize the distance between two activated segments 3, even further enhancing the advantages as mentioned above, i.e. keeping the total area with activated segments 3 as compact as possible to minimize the distance between two activated segments 3. E.g. starting with a middle column/ drain finger, all rows are first filled, and then the next column is selected, working from a center drain finger to outer side drain fingers.

Similar to the above described examples, the drain bar 33 of the corresponding digitally controlled segmented RF power transmitter is still positioned on the top of this table, and the associated drain fingers 31 are orientated from top to bottom. In the embodiments described above, the activation scheme activated first the segments 3 closest to the drain bar 33 (low numbered rows), and went on further away from the drain bar 33 (higher numbered rows). In this group of embodiments, the activation scheme variation activates drain finger 31 by drain finger 31 (i.e. column-by-column), again from a middle part to the sides. Thus, this activation scheme is again designed to keep a center of the waveform in the middle of the drain bar 33 of the associated digitally controlled segmented RF power transmitter. All further (groups of) embodiments described above can also be applied to this column-by-column activation scheme, which will be clarified using a number of examples.

In the below table, a pattern is shown implementing this embodiment for an example, where CWD-A=50 and CWD-B=20. In one example, to balance the waveform's center of gravity two columns/drain fingers are activated using alternating phasors when increasing the number of activated segments 3. The highest activated segments 3 are in this example split to the right and left over two columns $C_1<4>$ and $C_2<4>$.

of both decoders in this case needs to be half of the original activation bits (i.e.

$$\text{(i.e. } \frac{A+B}{2}\text{),}$$

wherein the input of one of the row-column decoders is rounded up, the other rounded down. In a similar way the phase selection bits which determines if a cell is A or B needs to be handled in the same way as described for the activation bits. Split for the two row-column decoders and interchange C and R entries.

It is noted that by activating one complete column/drain finger, the combined power in that drain finger is maximized, while other fingers are completely off. The high current flow can (locally) reduce the drain voltage possibly resulting in small bumps in CWD-AM and CWD-PM characteristics.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method of applying an activation scheme to a digitally controlled segmented RF power transmitter having a plurality of adjacent segments, each segment of the plu-

| | Left columns: $C_2$ ( . ) | | | | | | | | Right columns: $C_1$ ( . ) | | | | | | | | |
|---|---|---|---|---|---|---|---|---|---|---|---|---|---|---|---|---|---|
| | 〈7〉 | 〈6〉 | 〈5〉 | 〈4〉 | 〈3〉 | 〈2〉 | 〈1〉 | 〈0〉 | 〈0〉 | 〈1〉 | 〈2〉 | 〈3〉 | 〈4〉 | 〈5〉 | 〈6〉 | 〈7〉 | |
| $R_2$〈0〉 | – | – | – | A | A | B | A | B | A | B | A | B | A | – | – | – | $R_1$〈0〉 |
| $R_2$〈1〉 | | | | | | | | | | | | | | | | | $R_1$〈1〉 |
| $R_2$〈2〉 | – | – | – | A | A | B | A | B | A | B | A | B | A | – | – | – | $R_1$〈2〉 |
| $R_2$〈3〉 | | | | | | | | | | | | | | | | | $R_1$〈3〉 |
| $R_2$〈4〉 | – | – | – | – | A | A | A | B | A | B | A | A | A | – | – | – | $R_1$〈4〉 |
| $R_2$〈5〉 | | | | | | | | | | | | | | | | | $R_1$〈5〉 |
| $R_2$〈6〉 | – | – | – | – | A | A | A | B | A | B | A | A | – | – | – | – | $R_1$〈6〉 |
| $R_2$〈7〉 | | | | | | | | | | | | | | | | | $R_1$〈7〉 |
| | – | – | – | – | A | A | A | B | A | B | A | A | – | – | – | – | |
| | – | – | – | – | A | A | A | B | A | B | A | A | – | – | – | – | |
| | – | – | – | – | A | A | A | B | A | B | A | A | – | – | – | – | |
| | – | – | – | – | A | A | A | B | A | B | A | A | – | – | – | – | |

To activate each segment 3 in the array and to determine the phase the same approach as before is used, first step is determining and applying the activation bit, second step is to determine and apply the phasor selection bit. Comparing to the earlier described embodiments, the activation order is swapped for the rows and columns. The activation scheme is, nevertheless, again designed to keep a center of the waveform in the middle of the drain bar of the associated digitally controlled segmented RF power transmitter.

To implement this pattern, two row-column decoders are provided (similar to the decoder circuits shown in FIGS. 10 and 12, however with the entries for C and R interchanged (e.g. see FIGS. 10 and 12) to provide the new (90 degrees rotated activation scheme), one for the left side and one for the right side. Indicated by $R_1<n>$ and $R_2<n>$ for the rows and $C_1<m>$ and $C_2<m>$ for the columns. Both row-column decoders are half the size of the total array surface. The input rality of adjacent segments having an associated activation area, the plurality of adjacent segments being controlled by a code word, comprising:

controlling the plurality of adjacent segments by activating specific ones of the plurality of adjacent segments using an activation scheme depending on the code word, the activation scheme starting from center ones of the plurality of adjacent segments towards outer ones of the plurality of adjacent segments for increasing code word values.

2. The method according to claim 1, wherein the code word comprises two phasor code words, wherein adjacent segments of the plurality of adjacent segments are assigned to different phasors, depending on an associated one of the two phasor code words.

3. The method according to claim 2, wherein, if values of the two phasor code words are unequal, and sufficient segments of the plurality of adjacent segments have been activated to reach the lowest value of the two phasor code words, further adjacent available segments of the plurality of adjacent segments are assigned to the phasor associated with the other one of the two phasor code words.

4. The method according to claim 2, wherein the plurality of adjacent segments comprises an array of segments, the array having n rows and m columns, where i and j refer to an index of the row and column, respectively, and where n is the number of rows and m is the number of columns.

5. The method according to claim 4, wherein activation of a specific adjacent segment in row i and column j of the array is obtained using a decoder, which implements the logic formula: (R<i> AND C<j>) OR Row<i+1>, where R<i> refers to the $i^{th}$ row and C<j> refers to the $j^{th}$ column.

6. The method according to claim 2, wherein the activation scheme further comprises applying a phasor selector for selecting a first phasor or a second phasor when activating the segment of the plurality of adjacent segments, the phasor selector having a selection value—as long as the number of activated segments of the plurality of adjacent segments is less than the value of the associated code word and a non-selection value when the number of activated segments of the plurality of adjacent segments is equal to or higher than the value of the associated code word.

7. The method according to claim 5, wherein the activation scheme further comprises applying a phasor selector for selecting a first phasor or a second phasor when activating the segment of the plurality of adjacent segments, the phasor selector having a selection value as long as the number of activated segments of the plurality of adjacent segments is less than the value of the associated code word and a non-selection value when the number of activated segments of the plurality of adjacent segments is equal to or higher than the value of the associated code word, and wherein selecting the first phasor or the second phasor for a specific segment of the plurality of adjacent segments in row i and column j of the array is obtained using a second decoder, which implements the logic formula: ($R_A$<i> AND $C_A$<j>) OR $R_A$<i+1>, and ($R_B$<i> AND $C_B$<j>) OR $R_B$<i+1>, respectively, where $R_A$<i> refers to the ith row of the first phasor, $R_B$<i> refers to the ith row of the second phasor, where $C_A$<j> refers to the jth column of the first phasor, $C_B$<j> refers to the jth column of the second phasor.

8. The method according to claim 5, wherein the activation scheme further comprises applying a phasor selector for selecting a first phasor or a second phasor when activating the segment of the plurality of adjacent segments, the phasor selector having a selection value as long as the number of activated segments of the plurality of adjacent segments is less than the value of the associated code word and a non-selection value when the number of activated segments of the plurality of adjacent segments is equal to or higher than the value of the associated code word, and wherein selecting the first phasor or the second phasor for a specific segment of the plurality of adjacent segments in row i and column j of the array is obtained using a second decoder, which implements the logic formula: (($R_{phasor}$<x> AND $C_{phasor}$<$y_{phasor}$>) OR $R_{phasor}$<x+1>) OR PhSel, PhSel being an added bit indicating which of the associated code words is the highest.

9. The method according to claim 1, wherein the activation area of a predetermined group of the plurality of adjacent segments is equal.

10. The method according to claim 1, wherein the activation areas of a first subset of the plurality of adjacent segments are equal and provide a thermometer coding of their output power contribution, and a second subset of plurality of adjacent segments that provide an additional smaller part of the output power, using activation areas that are compatible with binary or thermometer coding.

11. The method according to claim 10, wherein the first subset of the plurality of adjacent segments comprises an array of adjacent segments, the array having n rows and m columns, further comprising m sets of the second subset of the plurality of adjacent segments, which are provided as a top row positioned adjacent to the n rows, where n is the number of rows and m is the number of columns.

12. The method according to claim 11, wherein for each phasor one of the m sets of the second subset is activated, corresponding to the highest column number activated in the first subset of the plurality of adjacent segments.

13. The method according to claim 10, wherein the first subset of the plurality of adjacent segments comprises an array of adjacent segments, the array having n rows and m columns where n is the number of rows and m is the number of columns, further comprising n sets of the second subset of the plurality of adjacent segments, which are provided as a middle column in the array.

14. The method according to claim 13, wherein for each phasor one of the n sets of the second subset is activated, corresponding to the highest row number activated in the first subset of the plurality of adjacent segments.

15. The method according to claim 4, wherein the activation scheme activates the plurality of adjacent segments row-by-row.

16. The method according to claim 4, wherein the activation scheme activates the plurality of adjacent segments column-by-column.

17. The method according to claim 1, wherein controlling the plurality of adjacent segments is applied dynamically.

18. The method according to claim 1, wherein the digitally controlled segmented RF power transmitter is operated with an operation frequency $f_{RF}$, and wherein controlling of the plurality of adjacent segments is applied in synchrony with RF cycles.

19. The method according to claim 1, wherein the plurality of adjacent segments comprise interleaved drain finger pairs in a push-pull configuration of the digitally controlled segmented RF power transmitter.

* * * * *